United States Patent
Furuta

(10) Patent No.: US 11,904,864 B2
(45) Date of Patent: Feb. 20, 2024

(54) UPDATE SYSTEM FOR RELATED VALUE INFORMATION AND UPDATE METHOD FOR RELATED VALUE INFORMATION

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/521,058

(22) Filed: Nov. 8, 2021

(65) Prior Publication Data
US 2022/0185292 A1 Jun. 16, 2022

(30) Foreign Application Priority Data
Dec. 11, 2020 (JP) ................................. 2020-205873

(51) Int. Cl.
*B60W 40/06* (2012.01)
(52) U.S. Cl.
CPC ......... *B60W 40/06* (2013.01); *B60W 2420/52* (2013.01); *B60W 2552/20* (2020.02)
(58) Field of Classification Search
CPC ............. B60W 40/06; B60W 2420/52; B60W 2552/20
USPC .......................................................... 701/1
See application file for complete search history.

(56) References Cited

U.S. PATENT DOCUMENTS

| | | | | |
|---|---|---|---|---|
| 10,830,908 B2 * | 11/2020 | Siegel | ................... | G01M 1/225 |
| 2003/0052814 A1 * | 3/2003 | Corbrion | ................. | G01S 13/60 |
| | | | | 342/115 |
| 2003/0080895 A1 * | 5/2003 | Mertins | ................... | G01S 13/60 |
| | | | | 342/194 |
| 2008/0137062 A1 * | 6/2008 | Holton | .................... | G01S 17/58 |
| | | | | 356/28 |
| 2008/0150786 A1 * | 6/2008 | Breed | .................. | B60N 2/2863 |
| | | | | 342/53 |
| 2008/0154629 A1 * | 6/2008 | Breed | ............ | B60W 30/18154 |
| | | | | 701/70 |
| 2010/0324780 A1 | 12/2010 | Koumura et al. | | |

(Continued)

FOREIGN PATENT DOCUMENTS

| CA | 2350624 A1 * | 5/2000 | ................ F16F 9/50 |
|---|---|---|---|
| JP | 1-240806 A | 9/1989 | |

(Continued)

*Primary Examiner* — Atul Trivedi
(74) *Attorney, Agent, or Firm* — Sughrue Mion, PLLC

(57) ABSTRACT

An update system for related value information, comprises a first vehicle and a storage device which stores related value information. The first vehicle provides, to the storage device, travel information formed by associating a sensor value for identifying a road surface displacement-related value, and a measurement position at which the sensor value is measured, with each other, in a period from a time at which a predetermined measurement start condition is satisfied to a time at which a predetermined measurement end condition is satisfied. The storage device updates the related value information based on based on the road surface displacement-related values from which a low frequency component is removed. The storage device updates related value information based on the road surface displacement-related values obtained by excluding, at least one of start-stage related values or end-stage related values.

12 Claims, 13 Drawing Sheets

(56) References Cited

U.S. PATENT DOCUMENTS

| | | | |
|---|---|---|---|
| 2011/0285518 A1* | 11/2011 | Gordon | B60W 40/06 |
| | | | 73/146 |
| 2018/0154723 A1 | 6/2018 | Anderson et al. | |
| 2019/0248027 A1* | 8/2019 | Nogami | G06F 11/3058 |
| 2019/0329610 A1* | 10/2019 | Hubert | G01M 13/045 |
| 2020/0139784 A1* | 5/2020 | Sridhar | B60G 21/08 |
| 2020/0223434 A1* | 7/2020 | Campos Macias | G06N 3/042 |
| 2020/0400821 A1* | 12/2020 | Baker | G01S 17/58 |
| 2022/0187458 A1* | 6/2022 | Piggott | G01S 17/34 |

FOREIGN PATENT DOCUMENTS

| | | | | |
|---|---|---|---|---|
| JP | 2006-86812 A | 3/2006 | | |
| JP | 2009-96366 A | 5/2009 | | |
| JP | 2016-107778 A | 6/2016 | | |
| JP | 2017-226270 A | 12/2017 | | |
| KR | 20220013579 A * | 2/2022 | | B60W 60/001 |
| WO | WO-2020195231 A1 * | 10/2020 | | B60W 40/06 |
| WO | WO-2020225699 A1 * | 11/2020 | | B60W 30/095 |
| WO | WO-2020225702 A1 * | 11/2020 | | B60W 40/06 |

\* cited by examiner

UNSPRUNG DISPLACEMENT INFORMATION

| BLOCK Gd | UNSPRUNG DISPLACEMENT $z1$ |
|---|---|
| X1,Y1 | $z1\_11$ |
| X1,Y2 | $z1\_12$ |
| ... | ... |
| Xm,Yn | $z1\_mn$ |

TRAVEL INFORMATION

| ID | POSITION INFORMATION | ddz2 | H |
|---|---|---|---|
| 0 | x0,y0 | ddz2_0 | H0 |
| 1 | x1,y1 | ddz2_1 | H1 |
| 2 | x2,y2 | ddz2_2 | H2 |
| ... | ... | ... | ... |
| n | xn,yn | ddz2_n | Hn |

UPDATE SYSTEM FOR RELATED VALUE INFORMATION AND UPDATE METHOD FOR RELATED VALUE INFORMATION

TECHNICAL FIELD

The present disclosure relates to an update system and an update method. The update system including a first vehicle and a storage device including a related value information storage configured to store related value information in which road surface displacement-related values are registered. In the update system, the storage device is configured to update the related value information based on travel information obtained during travel of the first vehicle.

BACKGROUND

Hitherto, there has been known a vehicle for executing preview damping control in order to damp a sprung portion of the vehicle. The preview damping control is control of generating a target control force, which is calculated based on a vertical displacement (hereinafter referred to as "road surface displacement") at a predetermined position forward of a current ground contact position of a wheel, between the wheel and a vehicle body part corresponding to the position of the wheel when the wheel passes the predetermined position.

As a vehicle of this type, there is known a vehicle (hereinafter referred to as "related-art vehicle") described in, for example, US 2018/154723. The related-art vehicle executes the preview damping control through use of data stored in a control map. This data is data formed by associating a position of a road surface and a "z" value being a value indicating a height of the position of the road surface with each other.

The related-art vehicle is successively obtaining, during travel, a road surface state value indicating a road surface state and a measurement position at which the road surface state value is measured.

The above-mentioned control map is updated based on the road surface state value measured by the related-art vehicle.

SUMMARY

Incidentally, the preview damping control is executed in order to damp a frequency component equal to or higher than a predetermined frequency (hereinafter referred to as "lowest frequency") of vibration input from the road surface to an unsprung portion when the vehicle travels on the road surface. It is desired that a frequency component of the "z" value to be damped through use of the preview damping control be stored in the control map. Thus, a management server for managing the control map applies, to the "z" value identified based on the road surface state value, "high-pass filter processing of removing the low frequency component lower than the lowest frequency from the 'z' value" and updates the control map based on the "z" value from which the low frequency component is removed.

The precision of the "z" value obtained immediately after the high-pass filter processing is reduced. This is because there is a possibility that, immediately after the high-pass filter processing, the frequency component lower than the lowest frequency is not completely removed due to a fact that a frequency lower than the above-mentioned lowest frequency of the vibration cannot be identified.

For example, when the high-pass filter processing is executed in the chronological order of the measurement of the sensor value, precision in a vicinity of the "z" value identified based on the oldest sensor value in the order of the measurement of the sensor value (in a vicinity of a start stage) is reduced. When the high-pass filter processing is executed in the reverse chronological order of the measurement of the sensor value, precision in a vicinity of the "z" value identified based on the newest sensor value in the order of the measurement of the sensor value (in a vicinity of an end stage) is reduced.

Further, when the low frequency component is removed from the "z" value as described below, the precision in the vicinity of the start stage and the precision in the vicinity of the end stage are reduced. The low frequency component is removed from the "z" value by adding a value obtained through the execution of the high-pass filter processing in the chronological order of the measurement of the sensor value and a value obtained through the execution of the high-pass filter processing in the reverse chronological order of the measurement of the sensor value to each other.

When the preview damping control is executed through use of the "z" value having the reduced precision, there is a possibility that the sprung portion is not appropriately damped. Thus, it is desired that the precision of the "z" value stored in the control map be not reduced.

The present disclosure has been made in view of the above-mentioned problem. That is, one object of the present disclosure is to provide a system for updating related value information so that precision of "a road surface displacement-related value being a value related to a road surface" registered in the related value information does not decrease, in order to increase a possibility of appropriate damping of a sprung portion through preview damping control.

An update system (hereinafter referred to as "system of the present disclosure") for related value information according to at least one embodiment of the present disclosure, comprises:

a first vehicle (30A, 30B); and
a storage device (20),
wherein the storage device is arranged in any one of the first vehicle and a place other than the first vehicle,
wherein the first vehicle includes a sensor (42, 43) configured to measure a sensor value for identifying a road surface displacement-related value, which is a value related to a road surface displacement being a displacement, in a vertical direction, of a road surface on which the first vehicle travels,
wherein the first vehicle is configured to:
obtain the sensor value from the sensor at predetermined measurement intervals (Step 705, Step 710) and obtain a measurement position at which the sensor value is measured (Step 715), in a period from a time at which a predetermined measurement start condition is satisfied to a time at which a predetermined measurement end condition is satisfied; and
provide, to the storage device, travel information formed by associating the sensor value and the measurement position with each other (Step 815),
wherein the storage device includes a related value information storage (200) configured to store related value information in which the road surface displacement-related value corresponding to a position of the road surface is registered, and
wherein the storage device is configured to:
apply high-pass filter processing to one of the sensor value included in the travel information provided from the first vehicle and the road surface displacement-related value identified based on the sensor value, to thereby obtain a road surface displacement-related value from which a low frequency component lower than a predetermined cutoff frequency is removed (Step 920); and update the related value information based on the road surface displacement-related values obtained by excluding, from the road surface displacement-related values from which the low frequency component is removed, at least one of: start-stage related values being a first predetermined number of road surface displacement-related values from a start-point related value being a road surface displacement-related value identified based on the sensor value obtained when the predetermined measurement start condition is satisfied; or end-stage related values being a second predetermined number of road surface displacement-related values to an end-point related value being a road surface displacement-related value identified based on the sensor value obtained when the predetermined measurement end condition is satisfied (Step 935, Step 950).

There is a possibility that precision of at least one of the start-stage related value or the end-stage related value decrease due to the high-pass filter processing. According to the system of the present disclosure, the related value information is updated based on the road surface displacement-related values from which at least one of the start-stage related values or the end-stage related values are excluded, and it is thus possible to prevent a decrease in the precision of the road surface displacement-related values registered in the related value information. As a result, it is possible to increase a possibility of the appropriate damping of the sprung portion through the preview damping control.

In one aspect of the system of the present disclosure, the storage device is configured to:

apply the high-pass filter processing to one of the sensor value and the road surface displacement-related value in a chronological order of the measurement of the sensor value (Step 920); and update the related value information based on the road surface displacement-related values obtained by excluding the start-stage related values from the road surface displacement-related values from which the low frequency component is removed (Step 935, Step 950).

When the high-pass filter processing is executed in the chronological order of the measurement, at a timing immediately after the measurement start condition is satisfied, the start-stage related values include the low frequency component due to a fact that the number of the related values is smaller than a number required to identify the frequency lower than the cutoff frequency, and there is thus a possibility that the precision of the start-stage related values decreases. According to the at least one aspect, the related value information is updated based on the road surface displacement-related values from which the start-stage related values are excluded, and it is thus possible to prevent the decrease in precision of the road surface displacement-related values registered in the related value information.

In one aspect of the system of the present disclosure, the storage device is configured to:

apply the high-pass filter processing to one of the sensor value and the road surface displacement-related value in a reverse chronological order of the measurement of the sensor value (Step 920); and update the related value information based on the road surface displacement-related values obtained by excluding the end-stage related values from the road surface displacement-related values from which the low frequency component is removed (Step 935, Step 950).

When the high-pass filter processing is executed in the reverse chronological order of the measurement, at a timing immediately before the measurement end condition is satisfied, the end-stage related values include the low frequency component due to a fact that the number of the related values is smaller than a number required to identify the frequency lower than the cutoff frequency, and there is thus a possibility that the precision of the end-stage related values decreases. According to the at least one aspect, the related value information is updated based on the road surface displacement-related values from which the end-stage related values are excluded, and it is thus possible to prevent the decrease in precision of the road surface displacement-related values registered in the related value information.

In one aspect of the system of the present disclosure, the storage device is configured to:

add a value which is obtained by applying the high-pass filter processing to one of the sensor value and the road surface displacement-related value in a chronological order of the measurement of the sensor value, and a value which is obtained by applying the high-pass filter processing to one of the sensor value and the road surface displacement-related value in a reverse chronological order of the measurement of the sensor value, to each other, to thereby remove the low frequency component from the road surface displacement-related value (Step 920); and update the related value information based on the road surface displacement-related values obtained by excluding the start-stage related values and the end-stage related values from the road surface displacement-related values from which the low frequency component is removed (Step 935, Step 950).

When the low frequency component is removed with the at least one aspect, there is a possibility that the precision of the start-stage related values and the end-stage related values are reduced. According to the at least one aspect, the related value information is updated based on the road surface displacement-related values from which the start-stage related values and the end-stage related values are excluded, and it is thus possible to prevent the decrease in precision of the road surface displacement-related values registered in the related value information.

In one aspect of the system of the present disclosure, the storage device is configured to:

determine whether the sensor values of the travel information provided from the first vehicle include a missing part having missing sensor values (IDs "200" to "249" of FIG. 11);

identify, when the sensor values of the travel information are determined to include the missing part, as the end-point related value, the road surface displacement-related value identified based on the sensor value obtained immediately before a start of the missing part (ID "199" of FIG. 11); and identify, when the sensor values of the travel information are determined to include the missing part, as the start-point related value, the road surface displacement-related value identified based on the sensor value obtained immediately after an end of the missing part (ID "250" of FIG. 11).

When the high-pass filter processing is applied to the travel information including the missing part, there is a possibility that the precision of the road surface displacement-related value is reduced immediately before the start of the missing part and immediately after the end of the missing part. According to the at least one aspect, the road surface displacement-related value identified based on the sensor value obtained immediately before the start of the missing part is identified as the end-point related value, and thus the second predetermined number of the road surface displacement-related values to this road surface displacement-related value are identified as the end-stage related values. Further, the road surface displacement-related value identified based on the sensor value obtained immediately after the end of the missing part is identified as the start-point related value, and thus the first predetermined number of the road surface displacement-related values to this road surface displacement-related value are identified as the start-stage related values. As a result, it is possible to prevent the update of the related value information based on the road surface displacement-related value which is likely to decrease in precision due to the missing part.

In one aspect of the system of the present disclosure, the storage device is configured to determine at least one of the first predetermined number or the second predetermined number based on a magnitude of a travel speed of the first vehicle and the predetermined cutoff frequency.

The number of the sensor values or the road surface displacement-related values required to identify the cutoff frequency changes in accordance with the magnitude of the travel speed and the cutoff frequency, and thus the number of at least one of the start-stage related values or the end-stage related values having the precision reduced by the high-pass filter processing also changes. According to the at least one aspect, at least one of the first predetermined number or the second predetermined number is determined to be an appropriate value in accordance with the magnitude of the travel speed and the cutoff frequency. As a result, it is possible to prevent occurrence of a state in which the road surface displacement-related values having the reduced precision cannot completely be excluded, and it is also possible to prevent occurrence of a state in which even road surface displacement-related values not having the reduced precision are excluded.

In one aspect of the system of the present disclosure, the storage device is configured to:
  obtain, as sampling values, a predetermined number of the sensor values included in the travel information in a chronological order of the measurement of the sensor values (Step 1205);
  apply fast Fourier transform to a value obtained by multiplying a weight coefficient, which is defined by a predetermined window function and corresponds to each of the sampling values, by the each of the sampling values, to thereby identify the road surface displacement-related value corresponding to the each of the sampling values (Step 1210 to Step 1225); and
  obtain a next sampling value from the sensor values included in the travel information after the application of the fast Fourier transform, and apply the fast Fourier transform to the value obtained by multiplying the next sampling value by the weight coefficient (Step 1240).
  wherein, in the predetermined window function:
  weight coefficients that reduce the sampling value to a smaller value are associated with start-stage sampling values, which are a third predetermined number of sampling values from a start point of the sampling values, and end-stage sampling values, which are a fourth predetermined number of sampling values to an end of the sampling values; and
  a weight coefficient that maintains an original value of the sampling value is associated with intermediate-stage sampling values being sampling values other than the start-stage sampling values and the end-stage sampling values, and
  wherein the storage device is configured to update the related value information based on the road surface displacement-related values obtained by excluding both of the start-stage related values and the end-stage related values from the road surface displacement-related values from which the low frequency component is removed.

When the fast Fourier transform is executed, the third predetermined number of road surface displacement-related values immediately after the start-point related value are identified based on values smaller than actual sampling values by the window function, and are thus likely to have reduced precision. Similarly, the fourth predetermined number of road surface displacement-related values immediately before the end-point related value are identified based on values smaller than actual sampling values, and are thus likely to have reduced precision. According to the at least one aspect, the related value information is updated based on the road surface displacement-related values from which both the start-stage related values and the end-stage related values are excluded. It is thus possible to prevent the decrease in precision of the road surface displacement-related values registered in the related value information.

In one aspect of the system of the present disclosure, the storage device is configured to apply the fast Fourier transform while obtaining the sampling value so that an end point of the intermediate-stage sampling values obtained a previous time is continuous to a start point of the intermediate-stage sampling values obtained this time (Step 1240), to thereby identify the road surface displacement-related value corresponding to the sensor value.

According to the above-mentioned aspect, of the road surface displacement-related values identified based on the sensor values included in the travel information, the road surface displacement-related values other than the third predetermined number of the road surface displacement-related values immediately after the start-point related value and the fourth predetermined number of the road surface displacement-related values immediately before the end-point related value are identified based on the actual sampling values. As a result, a larger number of road surface displacement-related values can accurately be identified.

In the above mentioned aspect, the third predetermined number is set to a value equal to or smaller than the first predetermined number, and
  the fourth predetermined number is set to a value equal to or smaller than the second predetermined number.

As a result, the road surface displacement-related values having the precision reduced by the fast Fourier transform can reliably be excluded.

In one aspect of the system of the present disclosure, the storage device is configured to update the related value information based on the road surface displacement-related values obtained by further excluding the road surface displacement-related values identified based on the sensor values measured when a magnitude of a travel speed of the first vehicle is equal to or smaller than a threshold value (Step 940, Step 950).

It is highly likely that the frequency of the sensor values at the time when the magnitude of the travel speed of the first vehicle is equal to or smaller than the threshold value is lower than that at the time when the magnitude of the travel speed of the first vehicle is larger than the threshold value. As the frequency of the sensor value decreases, the precision of the sensor value is likely to decrease due to influence of an offset of the sensor and the like. According to the at least one aspect, the related value information is not updated based on "the road surface displacement-related values identified based on the sensor values at the time when the magnitude of the travel speed of the first vehicle is larger than the threshold value, and the precision of the sensor values is thus likely to be low." Thus, it is possible to prevent the decrease in precision of the road surface displacement-related values registered in the related value information.

In one aspect of the system of the present disclosure, the update system further comprises a second vehicle (30A, 30B), which is one of the same vehicle as the first vehicle and a vehicle different from the first vehicle, wherein the storage device is arranged at any one of the first vehicle, the second vehicle, and a place other than the first vehicle and the second vehicle, wherein the second vehicle includes a control force generation device (37) configured to generate a control force in the vertical direction for damping a sprung portion of the second vehicle such that the control force is generated between at least one wheel of the second vehicle and a vehicle body part corresponding to a position of the at least one wheel, and wherein the second vehicle is configured to:
obtain, through use of the related value information held by the storage device, as a control related value, a road surface displacement-related value at a predicted passing position at which the at least one wheel is predicted to pass at a time when a predetermined period elapses from a current time (Step 1020); and execute preview damping control of controlling the control force generation device based on the control related value (Step 1030).

As a result, in the second vehicle, the preview damping control is executed based on the road surface displacement-related value at the predicted passing position obtained from the related value information. Thus, the road surface displacement-related value of the related value information has been updated so that the precision of the road surface displacement-related value does not decrease, and it is thus possible to increase the possibility that the sprung portion of the second vehicle can appropriately be damped through the preview damping control.

An update method for the related value information according to at least one embodiment of the present disclosure comprises:

obtaining, at predetermined measurement intervals, a sensor value measured by a sensor (41, 42) of a vehicle (30A, 30B) to identify the road surface displacement-related value of a road surface on which the vehicle is traveling and obtaining a measurement position at which the sensor value is measured, in a period from a time at which a predetermined measurement start condition is satisfied to a time at which a predetermined measurement end condition is satisfied (Step 705 to Step 715);

applying high-pass filter processing to one of the sensor value and the road surface displacement-related value identified based on the sensor value, to thereby obtain a road surface displacement-related value from which a low frequency component lower than a predetermined cutoff frequency is removed (Step 920); and updating the related value information based on the road surface displacement-related values obtained by excluding, from the road surface displacement-related values from which the low frequency component is removed, at least one of: a first predetermined number of road surface displacement-related values from a road surface displacement-related value identified based on the sensor value obtained when the predetermined measurement start condition is satisfied; or a second predetermined number of road surface displacement-related values to a road surface displacement-related value identified based on the sensor value obtained when the predetermined measurement end condition is satisfied (Step 935, Step 950).

According to the above-mentioned method, the related value information is updated based on the road surface displacement-related values from which the road surface displacement-related values having the precision reduced by the high-pass filter processing are excluded. Thus, it is possible to prevent the decrease in precision of the road surface displacement-related values registered in the related value information.

In the above description, for easier understanding of the present disclosure, the terms and/or reference symbols used in at least one embodiment described below are enclosed in parentheses and assigned to the components of the present disclosure corresponding to the at least one embodiment. However, the constituent elements of the present disclosure are not limited to the at least one embodiment defined by the terms and/or reference symbols. Other objects, other features, and accompanying advantages of the present disclosure are easily understandable from the description of the at least one embodiment of the present disclosure to be given with reference to the following drawings.

DESCRIPTION OF THE EMBODIMENTS

<Configuration>

Figure 1:
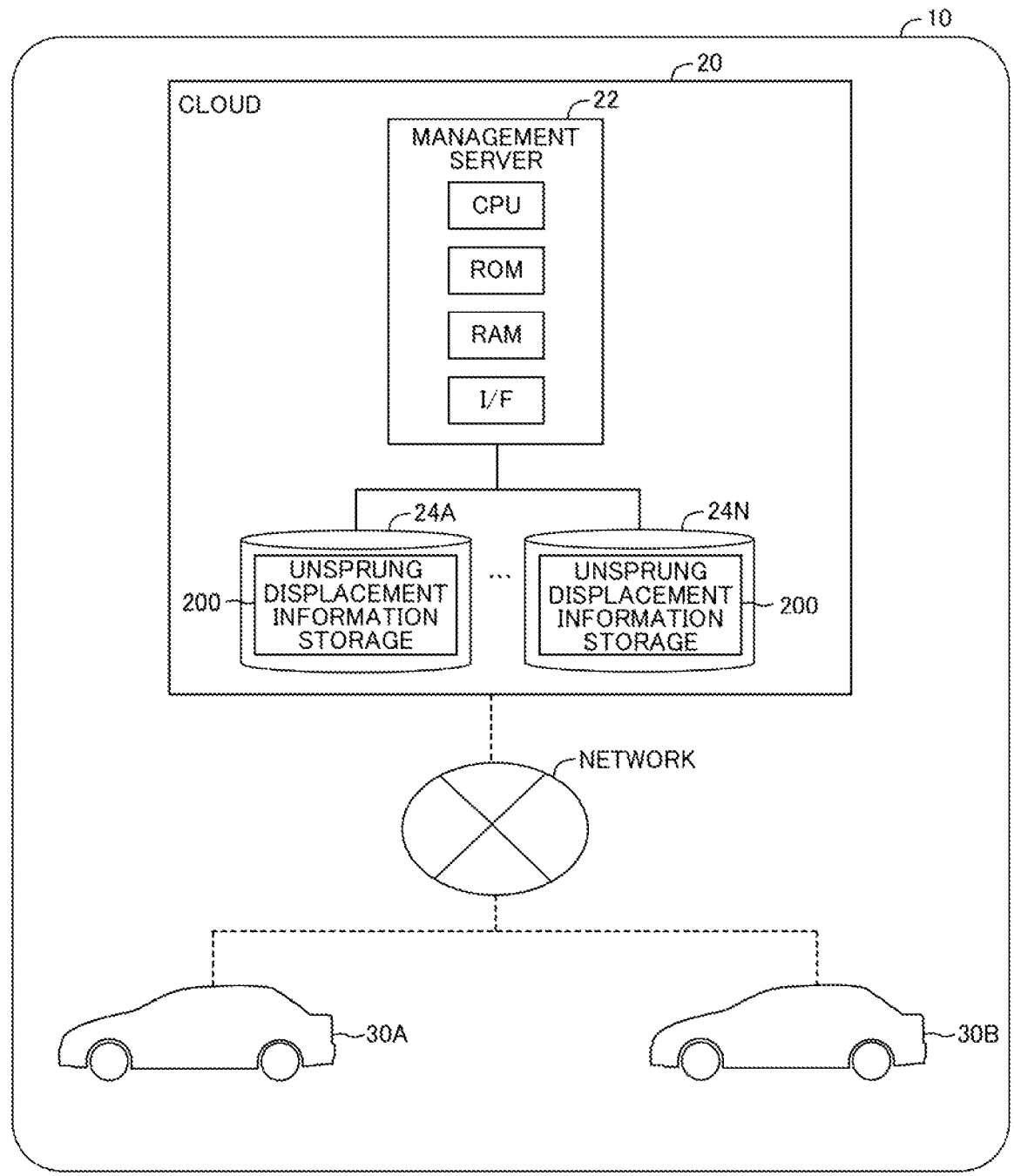
FIG. 1 is a network configuration diagram of a damping control system for a vehicle in at least one embodiment of the present disclosure.

As illustrated in FIG. 1, an update system 10 according to at least one embodiment of the present disclosure includes a cloud system 20 and a plurality of vehicles 30A and 30B. For the convenience of description, only the two vehicles 30A and 30B are illustrated in FIG. 1, but the update system 10 may further include a larger number of vehicles. When it is not required to distinguish the plurality of vehicles (30A and 30B) from each other, each of the plurality of vehicles such as the vehicles 30A and 30B is referred to as "vehicle 30." The vehicle 30 is connected to the cloud system 20 through a network in a manner that allows data communication. The update system 10 is only required to include at least one vehicle 30.

<Cloud System 20>

The cloud system 20 includes a management server 22 and storage media 24A to 24N. When it is not required to distinguish the storage media 24A to 24N from one another, each of the storage media 24A to 24N is referred to as "storage medium 24." The cloud system 20 is only required to include at least one storage medium 24. The storage medium 24 may be installed in the management server 22. The management server 22 is sometimes simply referred to as "server 22." The management server 22 and the storage media 24 are sometimes collectively referred to as "storage device."

The management server 22 includes a CPU, a ROM, a RAM, an interface (I/F), and the like. The management server 22 is connected to the storage media 24 in a manner that allows data communication. The management server 22 can search for and read out data stored in the storage media 24, and can write (store) data to the storage media 24.

Figures 2A, 2B:
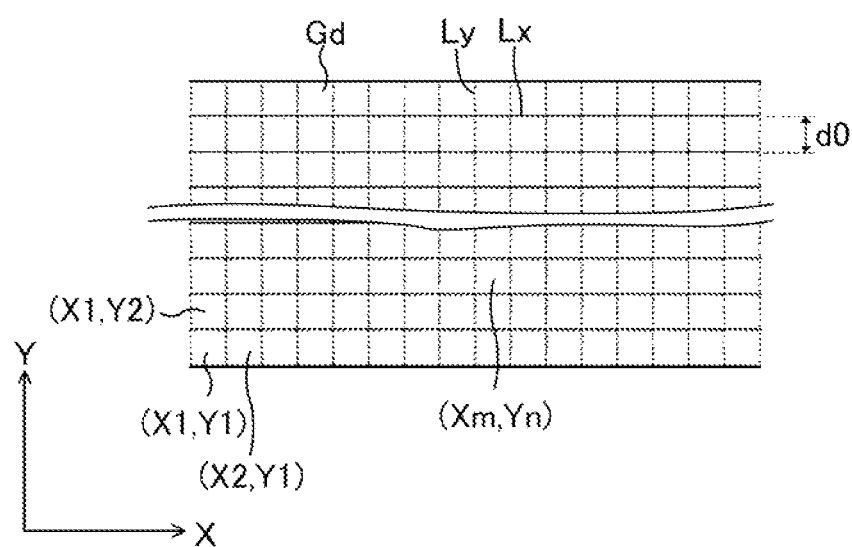
FIG. 2A is an explanatory table of unsprung displacement information stored in a storage device of FIG. 1.
FIG. 2B is an explanatory diagram of blocks of the unsprung displacement information.

Each of the storage media 24 includes an unsprung displacement information storage 200 for storing unsprung displacement information of FIG. 2A. The unsprung displacement information is sometimes referred to as "related value information." The unsprung displacement information storage 200 is sometimes referred to as "related value information storage." In the unsprung displacement information, an unsprung displacement z1 described below is stored in each of a plurality of blocks Gd of FIG. 2B. The blocks Gd are regions surrounded by a plurality of parallel lines Lx in an X direction and a plurality of parallel lines Ly in a Y direction. In this example, the blocks Gd are squares having sizes equal to one another. A distance d0 of one side of the block Gd has a value equal to or larger than 50 mm and equal to or smaller than 150 mm. In this example, the distance d0 is 100 mm. The shape of the block Gd is not limited to the square, and may be defined in accordance with the size and the shape of a ground contact region of a tire of the wheel 31 of the vehicle 30.

The X direction is the north direction in azimuth in this example. The Y direction is a direction perpendicular to the X direction. The position of the block Gd in the X direction and the Y direction are represented by a value Xm (m=1, 2, 3, . . . ) and a value Yn (n=1, 2, 3, . . . ). In other words, one of the plurality of blocks Gd is identified by a data set (Xm, Yn) of the value Xm and the value Yn. A range of each of the plurality of blocks Gd is defined by the latitude and the longitude. Thus, when position information identified by a combination of certain longitude and latitude is given, a specific block Gd (Xm, Yn) of the plurality of blocks Gd is determined.

<Vehicle 30>

Figure 3:
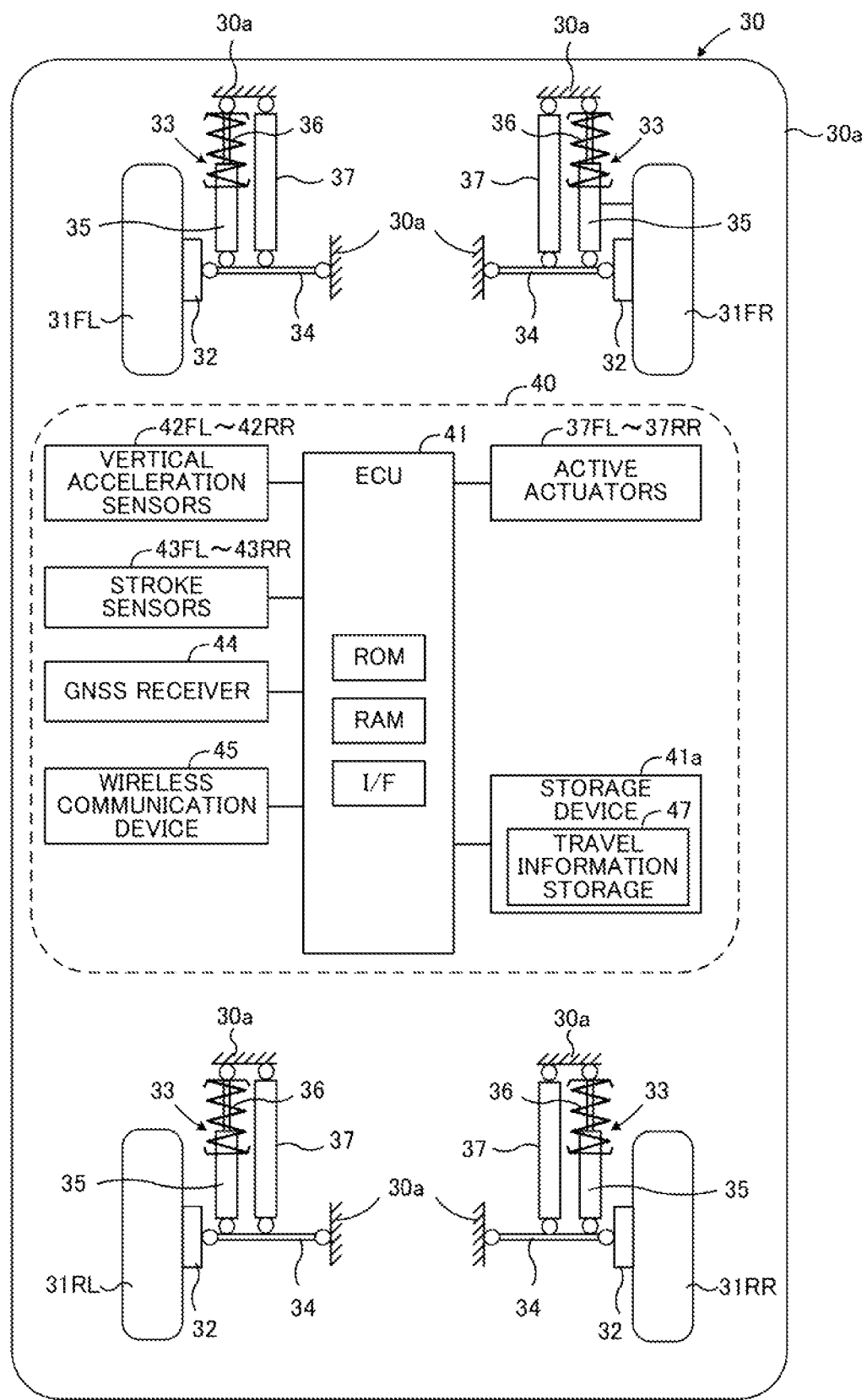
FIG. 3 is a schematic configuration diagram of the vehicle of FIG. 1.

With reference to FIG. 3, description is now given of the vehicle 30.

The vehicle 30 obtains "a sprung acceleration ddz2, a stroke H, and the position information (X, V)" described below for each of the wheels 31FL to 31RR in a period from a time at which a predetermined measurement start condition is satisfied to a time at which a predetermined measurement end condition is satisfied. For example, the measurement start condition is determined to be satisfied when a position of an ignition key switch is changed from an OFF position to an ON position. The measurement end condition is determined to be satisfied when the position of the ignition key switch is changed from the ON position to the OFF position. The position information (X, Y) includes a latitude and a longitude indicating a current position of the vehicle 30. The vehicle 30 associates those pieces of data (that is, the sprung acceleration ddz2, the stroke H, and the position information (X, Y)) with one another, and stores, as "travel information," the associated data in a memory (for example, RAM) of the vehicle 30. The travel information is described below with reference to FIG. 5A. The vehicle 30 transmits the travel information to the management server 22 when a predetermined transmission condition is satisfied. The transmission condition is determined to be satisfied when when the position of the ignition key switch is changed from the ON position to the OFF position, like the measurement end condition. When the management server 22 receives the travel information, the management server 22 uses the received travel information to update the unsprung displacement information.

The vehicle 30 includes a suspension system for each of the wheels 31FL to 31RR. A configuration of the suspension system is common among the wheels 31FL to 31RR. A reference symbol common among the wheels 31FL to 31RR is assigned to each of components of the suspension system. Further, in the following, components having "FL", "FR", "RL", and "RR" as ends of the reference symbols indicate components corresponding to the left front wheel, the right front wheel, the left rear wheel, and the right rear wheel, respectively. Moreover, when it is not required to distinguish the wheels 31FL to 31RR from one another, each of the wheels 31FL to 31RR is referred to as "wheel 31."

The wheel 31 is supported by a wheel support member 32 to be rotatable with respect to a vehicle body 30a (hereinafter sometimes referred to as "vehicle body part 30a"), and is suspended from the vehicle body 30a by a suspension 33 of an independent suspension type. The suspension 33 includes a suspension arm 34, a shock absorber 35, a suspension spring 36, and an active actuator 37. The suspension arm 34 couples the wheel support member 32 to the vehicle body 30a. In FIG. 3, only one suspension arm 34 of the wheel 31 is illustrated for the wheel 31, but a plurality of suspension arms 34 may be provided to the wheel 31. The suspension 33 may be a suspension of a type other than the independent suspension type.

The shock absorber 35 is coupled, at an upper end thereof, to the vehicle body 30a, and is coupled, at a lower end thereof, to the suspension arm 34. The suspension spring 36 is coupled, at an upper end thereof, to the vehicle body 30a, and is coupled, at a lower end thereof, to a cylinder of the shock absorber 35.

A member on the wheel 31 side with respect to the suspension spring 36 is referred to as "unsprung member 50 (see FIG. 4) or unsprung portion 50." Meanwhile, a member on the vehicle body 30a side with respect to the suspension spring 36 is referred to as "sprung member 51 (see FIG. 4) or sprung portion 51."

The active actuator 37 is provided in parallel to the shock absorber 35 and the suspension spring 36 between the vehicle body 30a and the suspension arm 34. The active actuator 37 is an active suspension device of an electromagnetic type, and generates a control force Fc based on a control command from an electronic control device (hereinafter referred to as "ECU") 41 described below. The control force Fc is a force in the vertical direction acting between the vehicle body 30a and the wheel 31 (that is, the sprung portion 51 of FIG. 4 and the unsprung portion 50 of FIG. 4) in order to damp the sprung portion 51. The active actuator 37 is sometimes referred to as "control force generation device 37." The active actuator 37, the shock absorber 35, the suspension spring 36, and the like form the active suspension.

Further, the damping control device 40 is mounted to the vehicle 30. The damping control device 40 includes the ECU 41. The ECU 41 includes a microcomputer. The microcomputer includes a CPU, a ROM, a RAM, an interface (I/F), and the like. The CPU executes instructions (programs and routines) stored in the ROM, to thereby achieve various functions. The ECU 41 is sometimes referred to as "control unit 41 or controller 41."

The ECU 41 is connected to a nonvolatile storage device 41a to and from which information can be written and read. In this example, the storage device 41a is a hard disk drive. The ECU 41 can store (preserve) the information in the storage device 41a, and can read out the stored (preserved) information in the storage device 41a. The storage device 41a is not limited to the hard disk drive, and is only required to be a well-known storage device or storage medium to and from which information can be written and read. The storage device 41a includes a travel information storage 47 which stores the travel information.

The ECU 41 is connected to vertical acceleration sensors 42FL to 42RR and stroke sensors 43FL to 43RR, and receive detection signals from those sensors.

When it is not required to distinguish the vertical acceleration sensors 42FL to 42RR from one another, each of the vertical acceleration sensors 42FL to 42RR is referred to as "vertical acceleration sensor 42." Similarly, each of the stroke sensors 43FL to 43RR is referred to as "stroke sensor 43."

The vertical acceleration sensor 42 measures the sprung acceleration ddz2 being an acceleration of the vehicle body 30a (sprung portion 51 of FIG. 4) in the vertical direction at a position of the corresponding wheel 31. The ECU 31 obtains the detection signal indicating the sprung acceleration ddz2 from the vertical acceleration sensor 42.

The stroke sensor 43 measures the stroke H in the vertical direction of the corresponding suspension 33. The ECU 41 obtains the detection signal indicating the stroke H from the stroke sensor 43.

The sprung acceleration ddz2 and the stroke H are values that change in accordance with a road surface displacement being a displacement of the road surface in the vertical direction, and are sometimes referred to as "sensor values."

Further, the ECU 41 is connected to a global navigation satellite system (GNSS) receiver 44, and a wireless communication device 45. The GNSS receiver 44 is a device for receiving positioning signals transmitted from positioning satellites. The ECU 41 uses the longitude and the latitude to identify the current position of the vehicle 30 based on the positioning signals received by the GNSS receiver 44. Further, the ECU 41 obtains the position information (X, Y) indicating the current position of the wheel 31 based on the identified current position of the vehicle 30 and "a positional relationship between the wheel 31 (each of the wheels 31FL to 31RR) and the GNSS receiver 44 in the vehicle 30." The value "X" indicates the latitude, and the value "Y" indicates the longitude.

The wireless communication device 45 is a device for connecting the ECU 41 to the network.

The vertical acceleration sensor 42, the stroke sensor 43, the GNSS receiver 44, and wireless communication device 45 are deactivated when the ignition key switch is at the OFF position. These are activated when the ignition key switch is at the ON position. The ECU 41 determines whether the ignition key switch is at the ON position or not, even if the ignition key switch is at the OFF position.

Further, the ECU 41 is connected to each of the active actuators 37FL to 37RR via a drive circuit (not shown).

The ECU 41 calculates a target control force Fct for damping the sprung portion 51 based on the unsprung displacement z1 at a predicted passing position described later of the wheel 31 (each of the wheels 31FL to 31RR). The ECU 41 controls the active actuator 37 so that the active actuator 37 generates a control force Fc corresponding to (matching) the target control force Fct when the wheel 31 (each of the wheels 31FL to 31RR) actually passes (reaches) the predicted passing position. This control of the active actuator 37 is referred to as "preview damping control."

<Overview of Preview Damping Control>

Figure 4:
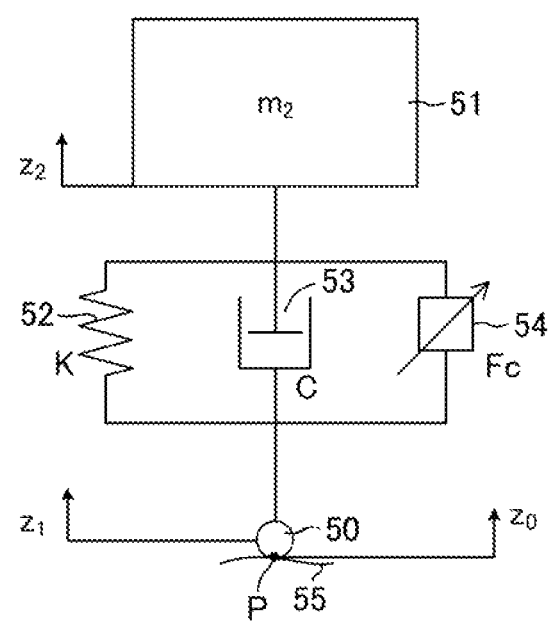
FIG. 4 is a diagram for illustrating a single-wheel model of the vehicle of FIG. 1.

FIG. 4 is diagram for illustrating a single-wheel model of the vehicle 30 on a road surface 55. A spring 52 of FIG. 4 corresponds to the suspension spring 36 of FIG. 3. A dumper 53 of FIG. 4 corresponds to the shock absorber 35 of FIG. 3. An actuator 54 of FIG. 4 corresponds to the active actuator 37 of FIG. 3.

In FIG. 4, the mass of the sprung portion 51 is represented by a sprung mass m2. A displacement of the unsprung portion 50 in the vertical direction at a position P of the road surface 55 is represented by the unsprung displacement z1. Further, a displacement of the sprung portion 51 in the vertical direction at the position P is represented by the sprung displacement z2. The sprung displacement z2 is a displacement of the sprung portion 51 in the vertical direction corresponding to the position of the wheel 31. The spring constant (equivalent spring constant) of the spring 52 is represented by a spring constant K. A damping coefficient (equivalent damping coefficient) of the damper 53 is represented by a damping coefficient C. A force generated by the actuator 54 is represented by the control force Fc.

Time derivatives of z1 and z2 are represented by dz1 and dz2, respectively. Second-order time derivatives of z1 and z2 are represented by ddz1 and ddz2, respectively. It is assumed in the following that an upward displacement of each of z1 and z2 is positive, and an upward force generated by each of the spring 52, the damper 53, the actuator 54, and the like is positive.

A motion equation for a motion of the sprung portion 51 of FIG. 4 in the vertical direction can be given by Expression (1).

$$m2 ddz2 = C(dz1-dz2) + K(z1-z2) - Fc \qquad (1)$$

It is assumed that the damping coefficient C of Expression (1) is constant. However, an actual damping coefficient changes in accordance with the stroke speed of the suspension 33. Thus, the damping coefficient C may be set to, for example, a value that changes in accordance with a time derivative of the stroke H.

Further, when vibration of the sprung portion 51 is completely canceled by the control force Fc (that is, when each of the sprung acceleration ddz2, the sprung speed dz2, and the sprung displacement z2 becomes zero), the control force Fc is given by Expression (2).

$$Fc = Cdz1 + Kz1 \quad (2)$$

When the active actuator 37 generates the control force Fc matching "the target control force Fct calculated in accordance with a mathematical expression given by Expression (3)" at a time (passing timing) when the wheel 31 passes the position P, the vibration of the sprung portion 51 can be reduced compared with a case in which the active actuator 37 does not generate the control force Fc. A gain $\beta 1$ of Expression (3) is a value (=km·C) obtained by multiplying the damping coefficient C by "any constant (km) larger than 0 and equal to or smaller than 1." A gain $\beta 2$ of Expression (3) is a value (=km·K) obtained by multiplying the spring constant K by the constant (km).

$$Fct = \beta 1 \times dz1 + \beta 2 \times z1 \quad (3)$$

The target control force Fct may be calculated based on Expression (4) obtained by omitting a differential term ($\beta 1 \times dz1$) from Expression (3). Also in this case, the actuator 54 generates the control force Fc (=($\beta 2 \times z1$)) for reducing the vibration of the sprung portion 51, and the vibration of the sprung portion 51 can thus be reduced compared with the case in which the control force Fc is not generated. Thus, the ECU 41 calculates the target control force Fct based on Expression (4). The gain $\beta 2$ is hereinafter simply referred to as "gain $\beta$."

$$Fct = \beta 2 \times z1 \quad (4)$$

Description is now given of the predicted passing position of the wheel 31.

A position apart from the current ground contact position of the wheel 31 by a pre-read distance Lp along a predicted movement course of the wheel 31 is the predicted passing position.

The predicted movement course is identified based on "a traveling direction Td of the vehicle 30 identified based on a history of the current position of the vehicle 30."

The pre-read distance Lp is obtained by multiplying a pre-read period Tp and a vehicle speed V1 by each other.

The pre-read period Tp is set in advance to a period required for the active actuator 37 to generate the control force Fc matching the target control force Fct after the ECU 41 identifies the predicted passing position.

The vehicle speed V1 is obtained by dividing a distance along the predicted movement course of the vehicle 30 from the current position of the vehicle 30 identified for the previous time to the current position of the vehicle 30 identified for this time by "a period from a time at which the current position of the vehicle 30 is identified for the previous time to a time at which the current position of the vehicle 30 is identified for this time."

The ECU 41 obtains the unsprung displacement z1 at "the predicted passing position obtained as described above", and transmits, to the active actuator 37, the control command including the target control force Fct calculated based on the unsprung displacement z1. As a result, the active actuator 37 can generate the control force Fc matching the target control force Fct at the timing at which the wheel 31 passes the predicted passing position.

(Overview of Operation of Update System 10)

Figures 5A, 5B:
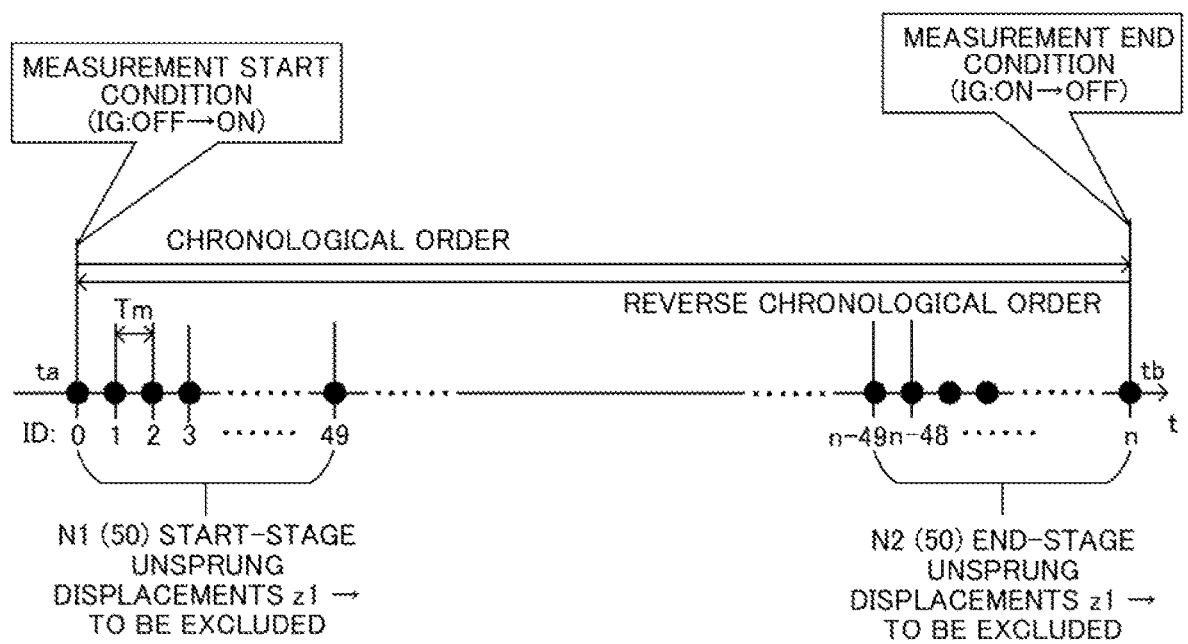
FIG. 5A is an explanatory diagram of start-stage unsprung displacements and end-stage unsprung displacements.
FIG. 5B is an explanatory table of travel information collected by the vehicle of FIG. 1.

As illustrated in FIG. 5A, the ECU 41 obtains (measures) pieces of data listed below at measurement intervals Tm in a period from a time "ta" at which the measurement start condition is satisfied to a time "tb" at which the measurement end condition is satisfied.

Sprung acceleration ddz2 corresponding to the wheel 31

Stroke H corresponding to the wheel 31

Position information (x, y) indicating the position (measurement position) of the wheel 31 at the time when the sprung acceleration ddz2 and the stroke H are obtained The ECU 41 assigns an identifier (hereinafter referred to as "ID") to one data set (ddz2, H, (x, y)) formed by associating those pieces of data with one another. The ECU 41 assigns the ID to the data set so that the value of the ID increases as an acquisition order of the data becomes newer. An ID "0" is assigned to a data set measured at the time "ta". An ID "n" ("n" is a natural number larger than 0) is assigned to a data set measured at the time "tb". After that, as shown in FIG. 5B, the ECU 41 stores, as the travel information, the data sets having the IDs assigned thereto in the travel information storage 47.

The ECU 41 transmits, to the management server 22, the travel information (including data sets having the ID "0" to the ID "n") stored in the travel information storage 47 at the time "tb" when the transmission condition is satisfied, and deletes the travel information stored in the travel information storage 47.

When the management server 22 receives the travel information, the management server 22 obtains the unsprung displacement z1 by subtracting the stroke H from "the sprung displacement z2 obtained through the second-order integration of the sprung acceleration ddz2 of the received travel information." After that, the management server 22 updates the unsprung displacement information based on the obtained unsprung displacement z1.

The management server 22 applies the high-pass filter processing through use of a predetermined cutoff frequency to the unsprung displacement z1, to thereby remove a low frequency component of the unsprung displacement z1 which is lower than the cutoff frequency. After that, the management server 22 updates the unsprung displacement information based on the unsprung displacement z1 from which the low frequency component is removed. As a result, the unsprung displacement information is updated based on the unsprung displacement information on the frequency component to be damped by the preview damping control.

Description is now given of details of the high-pass filter processing.

The management server 22 applies the high-pass filter processing to the unsprung displacements z1 in a chronological order of the acquisition of the sprung acceleration ddz2 and the stroke H used for the calculation of the unsprung displacement z1, to thereby obtain first values. Further, the management server 22 applies the high-pass filter processing to the unsprung displacements z1 in a reverse chronological order of the acquisition, to thereby obtain second values. The management server 22 adds the first value and the second value having the same ID to each other, to thereby remove the low frequency component from the unsprung displacement z1.

Immediately after a start of the high-pass filter processing applied in order to obtain the first values and the second values, the number of the unsprung displacements z1 to be sampled is still small. Thus, the low frequency component is less likely to be identified, and the unsprung displacements z1 obtained immediately after the start of the high-pass filter processing are likely to include the low frequency component. Accordingly, precision of the unsprung displacement z1 immediately after the start of the high-pass filter processing is likely to decrease.

Thus, precision of the first values is likely to decrease around the ID "0", and precision of the second values is likely to decrease around the ID "n". Accordingly, precision of the sum of the first value and the second value is likely to decrease at both of the start stage and the end stage.

To address the problem, the management server 22 does not execute update of the unsprung displacement information based on the start-stage unsprung displacements z1 and the end-stage unsprung displacement z1 of the unsprung displacements z1 from which the low frequency component is removed. The start-stage unsprung displacements z1 are a first predetermined number N1 of the unsprung displacements z1 from the unsprung displacement z1 having the ID "0" (hereinafter referred to as "start-point unsprung displacement z1" or "start-point related value"). In the example of FIG. 5A, the unsprung displacements z1 having the ID "0" to an ID "49" are the start-stage unsprung displacements z1. The end-stage unsprung displacements z1 are a second predetermined number N2 of the unsprung displacements z1 to the unsprung displacement z1 having the ID "n" (hereinafter referred to as "end-point unsprung displacement z1" or "end-point related value"). In the example of FIG. 5A, the unsprung displacements z1 having an ID "n−49" to the ID "n" are the end-stage unsprung displacements z1. The start-stage unsprung displacement z1 is sometimes referred to as "start-stage related value." The end-stage unsprung displacement z1 is sometimes referred to as "end-stage related value."

As described above, the unsprung displacement information is not updated based on the unsprung displacements z1 which is likely to decrease in precision due to the high-pass filter processing, and it is thus possible to prevent the precision of the unsprung displacements z1 registered in the unsprung displacement information from decreasing. Thus, the vehicle 30 can execute the preview damping control based on "the target control force Fct calculated based on the accurate unsprung displacement z1," and it is thus possible to increase the possibility that the sprung portion 51 is appropriately damped through the preview damping control.

(Specific Operation)

<Condition Satisfaction Determination Routine>

The CPU of the ECU 41 (hereinafter "first CPU" refers to the CPU of the ECU 41 unless otherwise specified) of the vehicle 30 executes a condition satisfaction determination routine illustrated as a flowchart of FIG. 6 each time a predetermined period elapses.

Figure 6:
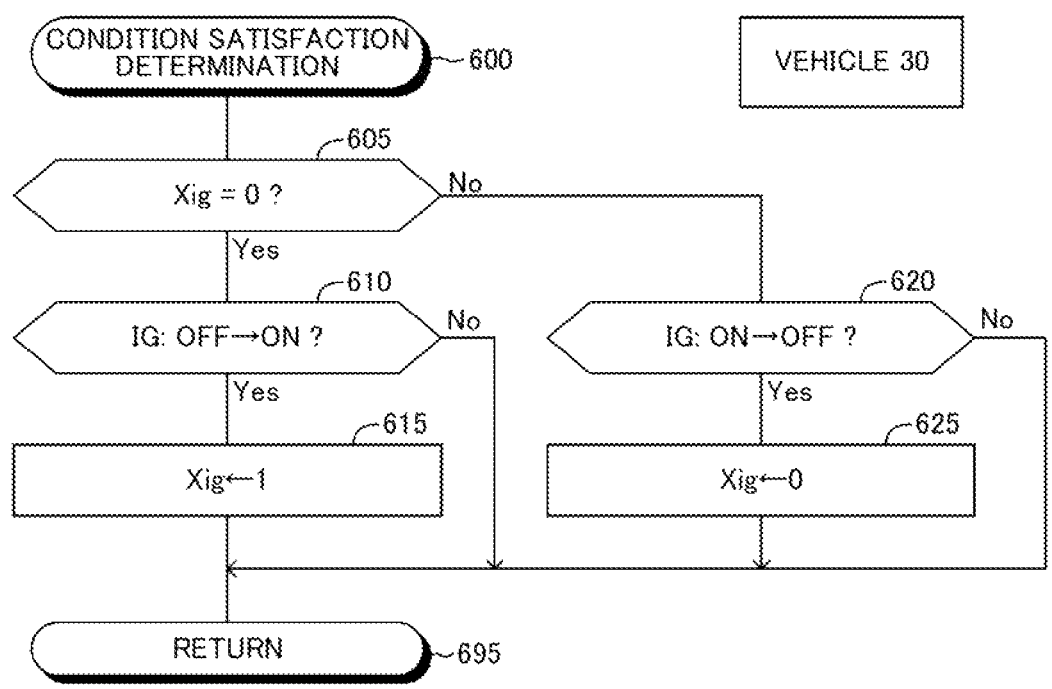
FIG. 6 is a flowchart for illustrating a condition satisfaction determination routine executed by the vehicle of FIG. 1.

Thus, the first CPU starts processing from Step 600 of FIG. 6 at a predetermined timing, and the process proceeds to Step 605. In Step 605, the first CPU determines whether or not the value of a startup flag Xig is "0". When the ignition key switch is at the OFF position, the value of the startup flag Xig is set to "0". When the ignition key switch is at the ON position, the value of the startup flag Xig is set to "1".

When the value of the startup flag Xig is "0", the first CPU makes a determination of "Yes" in Step 605, and the process proceeds to Step 610. In Step 610, the first CPU determines whether or not the ignition key switch has been changed from the OFF position to the ON position.

When the ignition key switch has been changed from the OFF position to the ON position, the first CPU makes a determination of "Yes" in Step 610. Then, the process proceeds to Step 615, and the first CPU sets the value of the startup flag Xig to "1". After that, the process proceeds to Step 695, and the first CPU temporarily finishes this routine.

When the ignition key switch has not been changed from the OFF position to the ON position, the first CPU makes a determination of "No" in Step 610. Then, the process proceeds to Step 695, and the first CPU temporarily finishes this routine.

Meanwhile, when the value of the startup flag Xig is "1" in the case in which the process proceeds to Step 605, the first CPU makes a determination of "No" in Step 605, and the process proceeds to Step 620. In Step 620, the first CPU determines whether or not the ignition key switch has been changed from the ON position to the OFF position.

When the ignition key switch has been changed from the ON position to the OFF position, the first CPU makes a determination of "Yes" in Step 620. Then, the process proceeds to Step 625, and the first CPU sets the value of the startup flag Xig to "0". After that, the process proceeds to Step 695, and the first CPU temporarily finishes this routine.

When the ignition key switch has not been changed from the ON position to the OFF position, the first CPU makes a determination of "No" in Step 620. Then, the process proceeds to Step 695, and the first CPU temporarily finishes this routine.

<Travel Information Collection Routine>

The first CPU executes a travel information collection routine illustrated as a flowchart of FIG. 6 each time a predetermined period (measurement interval) elapses. This routine is executed for each of the wheels 31FL to 31RR.

Figure 7:
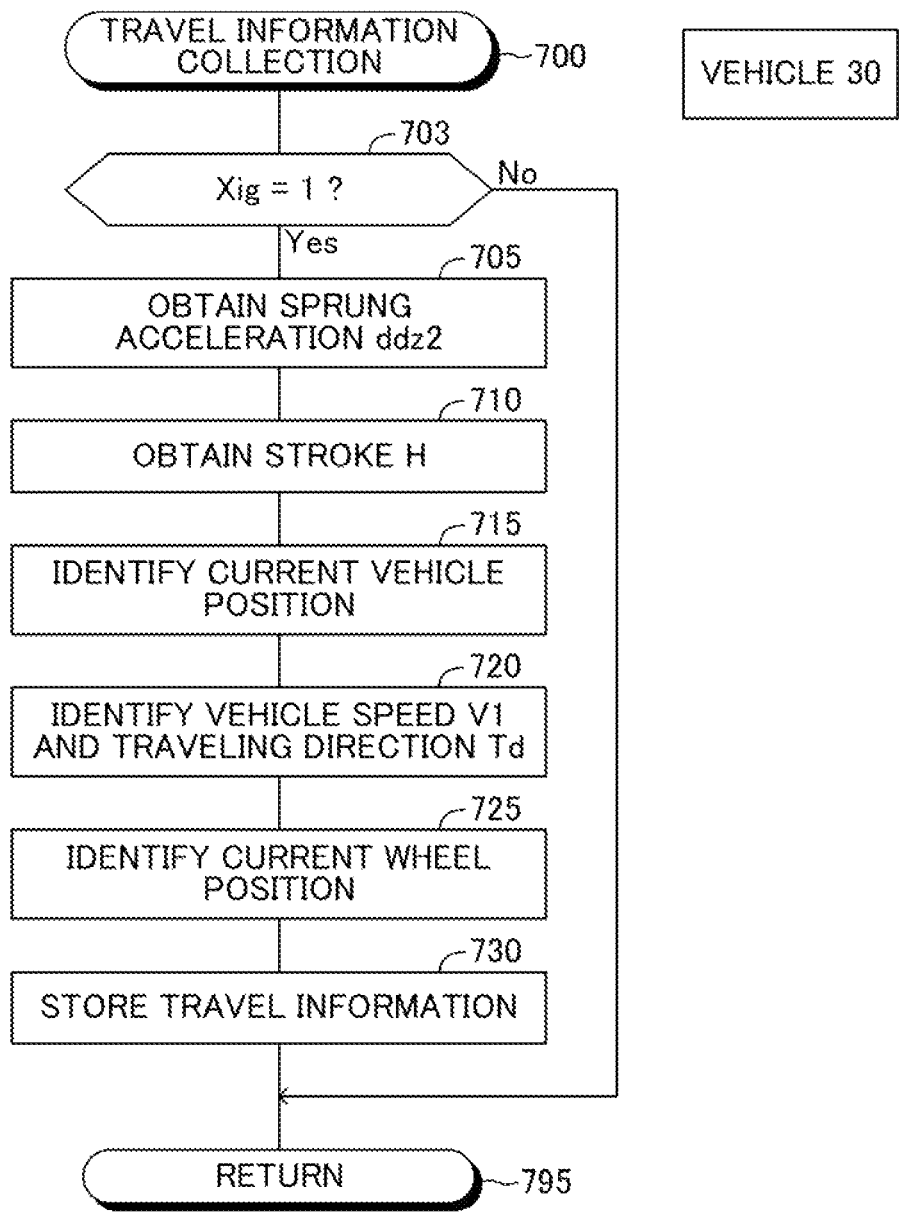
FIG. 7 is a flowchart for illustrating a travel information collection routine executed by the vehicle of FIG. 1.

Thus, the first CPU starts processing from Step 700 of FIG. 7 at a predetermined timing, and the process proceeds to Step 703. In Step 703, the first CPU determines whether or not the value of a startup flag Xig is "1". When the value of the startup flag Xig is "0", the first CPU makes a determination of "No" in Step 703. Then, the process proceeds to Step 795, and the first CPU temporarily finishes this routine.

Meanwhile, when the value of the startup flag Xig is "1", the first CPU makes a determination of "Yes" in Step 703, and executes processing steps of Step 705 to Step 730 in the stated order. After that, the process proceeds to Step 795, and the first CPU temporarily finishes this routine.

Step 705: The first CPU obtains the sprung acceleration ddz2 from the vertical acceleration sensor 42.

Step 710: The first CPU obtains the stroke H from the stroke sensor 43. The stroke H is a stroke of the suspension 33 in the vertical direction, and corresponds to a value obtained by subtracting the unsprung displacement z1 from the sprung displacement z2.

Step 715: The first CPU identifies the current position of the vehicle 30 (that is, the current position of the GNSS receiver 44) based on the positioning signals received by the GNSS receiver 44.

Step 720: The CPU identifies the vehicle speed V1 and the traveling direction Td based on the current position for the previous time and the current position for this time of the vehicle 30.

Step 725: The CPU identifies the current position of the wheel 31 based on the current position and the traveling direction Td of the vehicle 30, and the above-mentioned positional relationship data.

Step 730: The first CPU assigns the ID to the data set formed by associating the sprung acceleration ddz2, the stroke H, and the position information (x, y) indicating the current position of the wheel 31 with one another, and stores the data set having the ID assigned thereto in the travel information storage 47. The ID is assigned in a chronological order of the acquisition of the data set starting from "0".

<Travel Information Transmission Routine>

Figure 8:
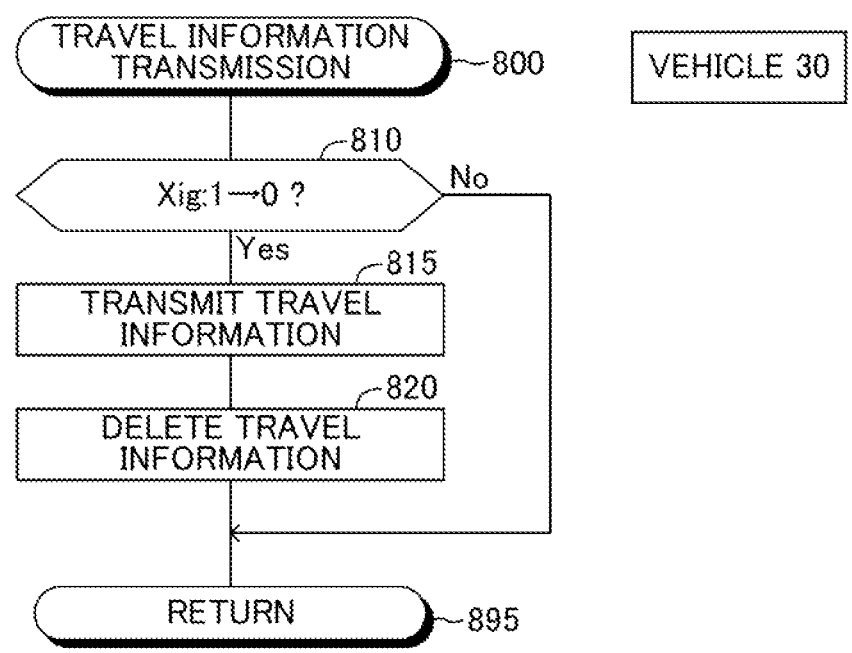
FIG. 8 is a flowchart for illustrating a travel information transmission routine executed by the vehicle of FIG. 1.

The first CPU executes a travel information transmission routine illustrated as a flowchart of FIG. 8 each time a predetermined period elapses.

Thus, the first CPU starts processing from Step 800 of FIG. 8 at a predetermined timing. Then, the process proceeds to Step 810, and the first CPU determines whether or not the value of the startup flag Xig has changed from "1" to "0".

When the value of the startup flag Xig has not changed from "1" to "0", the first CPU makes a determination of "No" in Step 810. Then, the process proceeds to Step 895, and the first CPU temporarily finishes this routine.

When the value of the startup flag Xig has changed from "1" to "0", the first CPU makes a determination of "Yes" in Step 810, and executes processing steps of Step 815 and Step 820. After that, the process proceeds to Step 895, and the first CPU temporarily finishes this routine.

Step 815: The first CPU transmits, to the management server 22, the travel information stored in the travel information storage 47.

Step 820: The first CPU deletes the travel information stored in the travel information storage 47.

<Unsprung Displacement Information Update Routine>

The CPU of the management server 22 (hereinafter "second CPU" refers to the CPU of the management server 22 unless otherwise specified) executes an unsprung displacement information update routine illustrated as a flowchart of FIG. 9 each time a predetermined period elapses.

Figure 9:
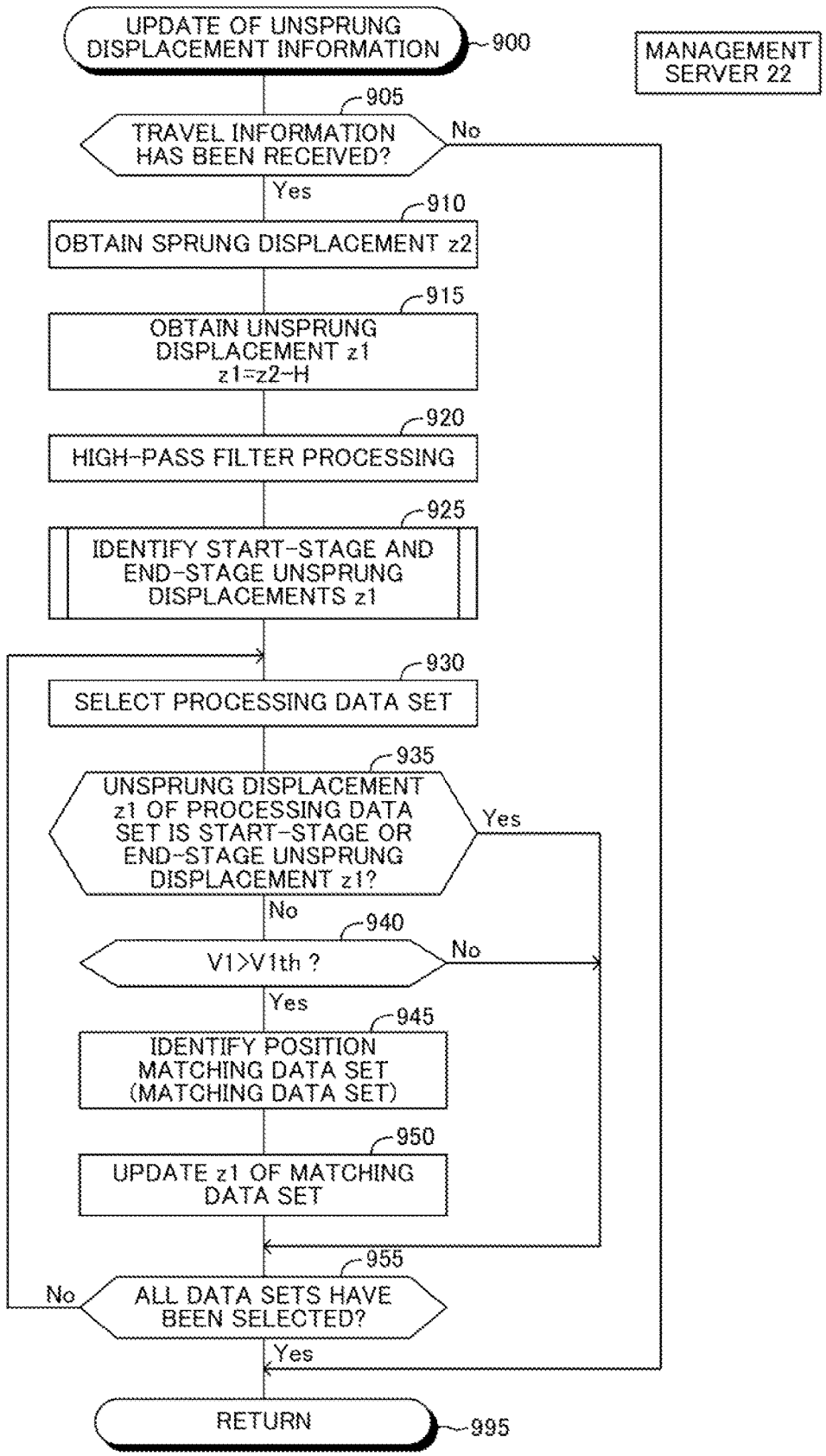
FIG. 9 is a flowchart for illustrating an unsprung displacement information update routine executed by a server of FIG. 1.

Thus, the second CPU starts processing from Step 900 of FIG. 9 at a predetermined timing. Then, the process proceeds to Step 905, and the second CPU determines whether or not the travel information has been received from the vehicle 30 in a period from a time at which this routine was executed previously to a time at which this routine is executed for this time. When the travel information has not been received in that period, the second CPU makes a determination of "No" in Step 905. Then, the process proceeds to Step 995, and the second CPU temporarily finishes this routine.

When the travel information has been received in the above-mentioned period, the second CPU makes a determination of "Yes" in Step 905, and executes Step 910 to Step 935 in the stated order.

Step 910: The second CPU obtains the sprung displacement $z2$ through the second-order integration of the sprung acceleration $ddz2$.

Step 915: The second CPU subtracts the stroke H associated with the sprung displacement $z2$ from the sprung displacement $z2$, to thereby obtain the unsprung displacement $z1$. The second CPU deletes the sprung acceleration $ddz2$ and the stroke H from each data set of the travel information, and instead, registers the unsprung displacement $z1$ obtained in Step 915. As a result, in each data set (hereinafter sometimes referred to as "original data set") of the travel information held by the management server 22, the unsprung displacement $z1$ and the position information (x, y) are associated with each other. The second CPU may obtain, without deleting the sprung acceleration $ddz2$ and the stroke H2, as the original data set, a data set formed by associating the unsprung displacement $z1$ and the position information (x, y) with each other.

Step 920: The second CPU applies the above-mentioned high-pass filter processing to the unsprung displacement $z1$.

Step 925: The second CPU identifies the start-stage unsprung displacements $z1$ and the end-stage unsprung displacements $z1$. More specifically, the second CPU identifies the start-point unsprung displacement $z1$ and the end-point unsprung displacement $z1$ based on the IDs of the data sets included in the travel information. After that, the second CPU identifies the first predetermined number N1 of the unsprung displacements $z1$ from the start-point unsprung displacement $z1$ as the start-stage unsprung displacements $z1$. More specifically, the second CPU manages N1 IDs from the ID "0" to an ID "N1−1" as the start-stage IDs. Further, the second CPU identifies the second predetermined number N2 of the unsprung displacements $z1$ from the end-point unsprung displacement $z1$ as the end-stage unsprung displacements $z1$. More specifically, the second CPU manages N2 IDs from an ID "n−N2+1" to the ID "n" as the end-stage IDs. In the example of FIG. 5A, the first predetermined number N1 and the second predetermined number N2 are set to the same value, but may be set to values different from each other.

Step 930: The second CPU selects, as a processing data set, one data set to be used for processing steps of Step 935 to 950 described below from the original data sets.

Step 935: The second CPU determines whether or not the unsprung displacement $z1$ of the processing data set is any one of the start-stage unsprung displacement $z1$ and the end-stage unsprung displacement $z1$. More specifically, the second CPU determines whether or not the ID of the processing data set is any one of the start-stage ID and the end-stage ID.

When the unsprung displacement $z1$ of the processing data set is none of the start-stage unsprung displacement $z1$ and the end-stage unsprung displacement $z1$, the second CPU makes a determination of "No" in Step 935, and the process proceeds to Step 940. In Step 940, the second CPU determines whether or not the magnitude of the vehicle speed V1 of the vehicle 30 at the time when the processing data set was obtained is larger than a speed threshold value V1th. The second CPU obtains the vehicle speed V1 by dividing a travel distance D by the measurement interval. The travel distance D is calculated based on a position indicated by the position information (x, y) of the processing data set and a position indicated by the position information (x, y) of the data set having an ID next to the ID of the processing data set.

When the magnitude of the vehicle speed V1 is larger than the speed threshold value V1th, the second CPU makes a determination of "Yes" in Step 940, and executes processing steps of Step 945 to Step 955.

Step 945: The second CPU identifies, as a matching data set, a data set that includes, in the block Gd, the position indicated by the position information (x, y) of the processing data set among the data sets on the unsprung displacement information.

Step 950: The second CPU updates the unsprung displacement $z1$ of the matching data set based on the unsprung displacement $z1$ of the processing data set.

Description is now given of an example of the update of the unsprung displacement $z1$ of the matching data set.

The second CPU calculates an average value or a weighted average value of the unsprung displacement $z1$ of the matching data set and the unsprung displacement $z1$ of the processing data set as a new unsprung displacement $z1$, and overwrites the unsprung displacement $z1$ of the matching data set with this new unsprung displacement $z1$. The second CPU may overwrite the unsprung displacement z1 of the matching data set with the unsprung displacement z1 of the processing data set.

Step 955: The second CPU determines whether or not there have been selected, as the processing data set, all of the original data sets generated based on the travel information received in a period from the time at which this routine was executed for the previous time to the time at which this routine is executed for the current time.

When all of the original data sets have not been selected as the processing data set, the second CPU makes a determination of "No" in Step 955, and the process returns to Step 930. Then, the second CPU selects a new processing data set from the original data sets, and the process proceeds to Step 935.

When the unsprung displacement z1 of the processing data set is any one of the start-stage unsprung displacement z1 and the end-stage unsprung displacement z1 in the case in which the process proceeds to Step 935, the second CPU makes a determination of "Yes" in Step 935, and the process proceeds to Step 955. That is, in this case, the second CPU does not update the unsprung displacement information based on the unsprung displacement z1 of the processing data set. As described above, due to the influence of the high-pass filter processing, the precision of the start-stage unsprung displacement z1 and the end-stage unsprung displacement z1 may be reduced. When the unsprung displacement z1 of the processing data set is any one of the start-stage unsprung displacement z1 and the end-stage unsprung displacement z1, the precision of this unsprung displacement z1 may be reduced. According to the at least one embodiment, when the unsprung displacement information is not updated based on the unsprung displacement z1 having the reduced precision, and it is thus possible to prevent a decrease in precision of the unsprung displacement z1 registered in the unsprung displacement information.

Meanwhile, when the magnitude of the speed V1 is equal to or lower than the speed threshold value V1th in the case in which the process proceeds to Step 940, the second CPU makes a determination of "No" in Step 940, and the process proceeds to Step 955 without updating the unsprung displacement information based on the unsprung displacement z1 of this processing data set. The frequencies of the sprung acceleration ddz2 and the stroke H at the time when the magnitude of the vehicle speed V1 is equal to or smaller than the speed threshold value V1th are highly likely to be lower than those at the time when the magnitude of the vehicle speed V1 is larger than the speed threshold value V1th. As the frequency of the sprung acceleration ddz2 decreases, the precision of the sprung acceleration ddz2 tends to be influenced more by an offset of the vertical acceleration sensor 42. Thus, as the frequency of the sprung acceleration ddz2 decreases, there increases the possibility that the precision of the sprung acceleration ddz2 decreases. As the frequency of the stroke H decreases, there also increases possibility that the precision of the stroke H decreases. The precision of the unsprung displacement z1 calculated based on the sprung acceleration ddz2 and the stroke H decreases as the frequencies decrease. In the at least one embodiment, the unsprung displacement information is not updated based on the unsprung displacement z1 at the time when the magnitude of the vehicle speed V1 is equal to or smaller than the speed threshold value V1th. As a result, it is possible to prevent the decrease in precision of the unsprung displacement z1 registered in the unsprung displacement information.

<Preview Damping Control Routine>

Figure 10:
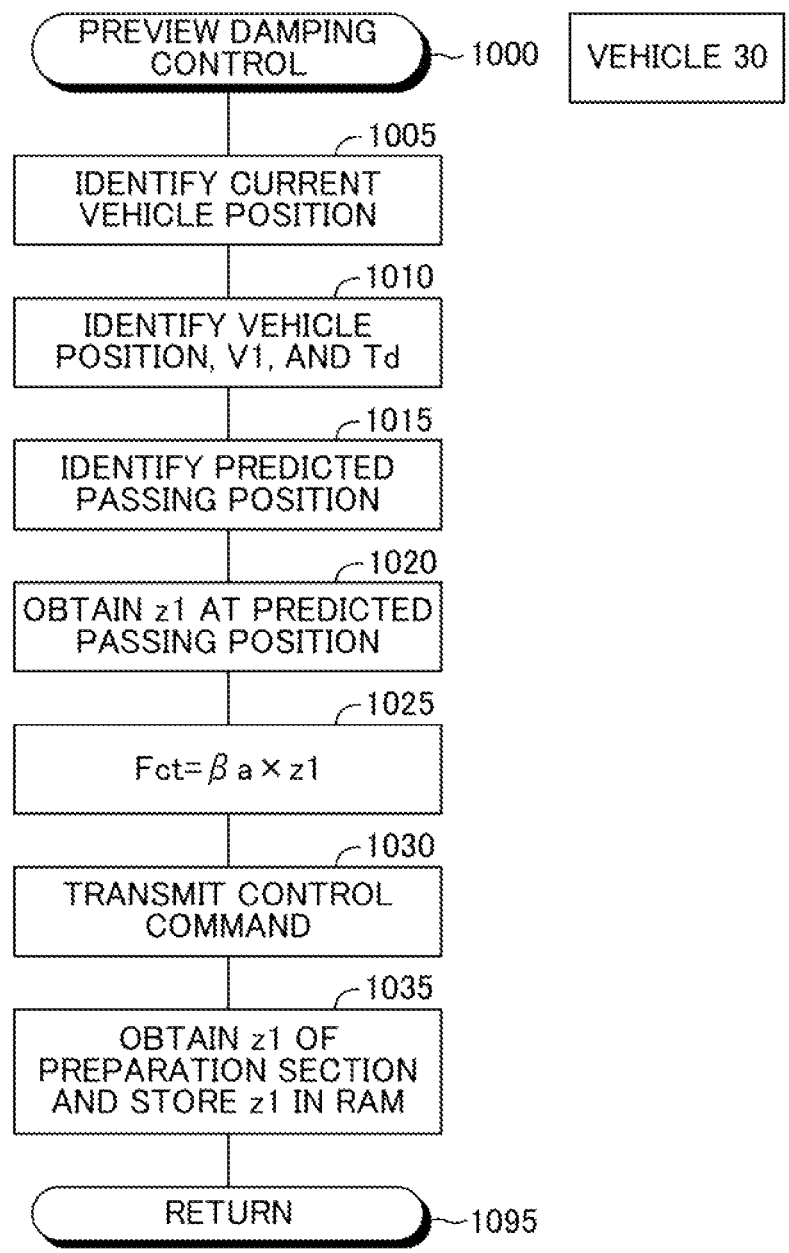
FIG. 10 is a flowchart for illustrating a preview damping control routine executed by the vehicle of FIG. 1.

The first CPU executes a preview damping control routine illustrated as a flowchart of FIG. 10 each time a predetermined period elapses. This routine is executed for each of the wheels 31FL to 31RR.

Thus, the first CPU starts processing from Step 1000 of FIG. 10 at a predetermined timing, and executes Step 1005 to Step 1035 in the stated order.

Step 1005: The first CPU identifies the current position of the vehicle 30 based on the positioning signals received by the GNSS receiver 44.

Step 1010: The first CPU identifies the vehicle speed V1 and the traveling direction Td in the same manner as in Step 720 of FIG. 7, and identifies the current position of the wheel 31 in the same manner as in Step 725 of FIG. 7.

Step 1015: The first CPU identifies the predicted passing position of the wheel 31 based on the current position of the wheel 31, the vehicle speed V1, and the traveling direction Td.

Step 1020: The first CPU obtains the unsprung displacement z1 at the predicted passing position from "unsprung displacements z1 in a preparation section" described below, which are obtained in advance from the unsprung displacement information of the cloud system 20. The unsprung displacement z1 of the predicted passing position is sometimes referred to as "control related value."

Step 1025: The first CPU calculates the target control force Fct through use of Expression (5).

$$Fct = \beta a \times z1 \quad (5)$$

The value "βa" of Expression (5) is a predetermined gain, and is referred to as "first gain βa." The value z1 of Expression (5) is the unsprung displacement z1 at the predicted passing position.

Step 1030: The first CPU transmits the control command including the target control force Fct to the active actuator 37.

Step 1035: When the predicted passing position reaches a position ahead of an end point of the preparation section by a predetermined distance, the first CPU obtains "the unsprung displacements z1 and the position information (x, y)" of "the preparation section having the predicted passing position as a start point" from the unsprung displacement information of the cloud system 20, and stores the obtained unsprung displacement z1 and position information (x, y) in the RAM.

The preparation section is a section having the predicted passing position as the start point and the position apart from the start point by a predetermined preparation distance along the predicted movement course of the wheel 31 as the end point. The preparation distance is set in advance to a value sufficiently longer than the pre-read distance.

As appreciated from the description given above, according to the at least one embodiment, the unsprung displacement information is not updated based on the unsprung displacement z1 having low precision, and it is thus possible to prevent the decrease in precision of the unsprung displacement z1 included in the data set of the unsprung displacement information.

The present disclosure is not limited to the at least one embodiment and modification examples described above, and various modification examples can be adopted within the scope of the present disclosure.

First Modification Example

There is a possibility that a part of the travel information received by the management server 22 is missing due to a failure of the transmission of the part of the travel information by the vehicle 30, a failure of the acquisition of the detection signal from the acceleration sensor 42 by the vehicle 30, or the like. When the high-pass filter processing is applied to the unsprung displacements z1 identified based on the travel information including the missing part, there is a possibility that the precision of the unsprung displacements z1 around the missing part decreases.

To address the problem, in a first modification example of the present disclosure, the second CPU determines whether or not the received travel information includes a missing part. When the second CPU determines that the received travel information includes a missing part, the second CPU identifies an unsprung displacement z1 identified based on a data set immediately before a start of the missing part as an end-point unsprung displacement z1, to thereby identify end-stage unsprung displacements z1. Further, the second CPU identifies an unsprung displacement z1 identified based on a data set immediately after the end of the missing part as a start-point unsprung displacement z1, to thereby identify start-stage unsprung displacements z1.

Figure 11:
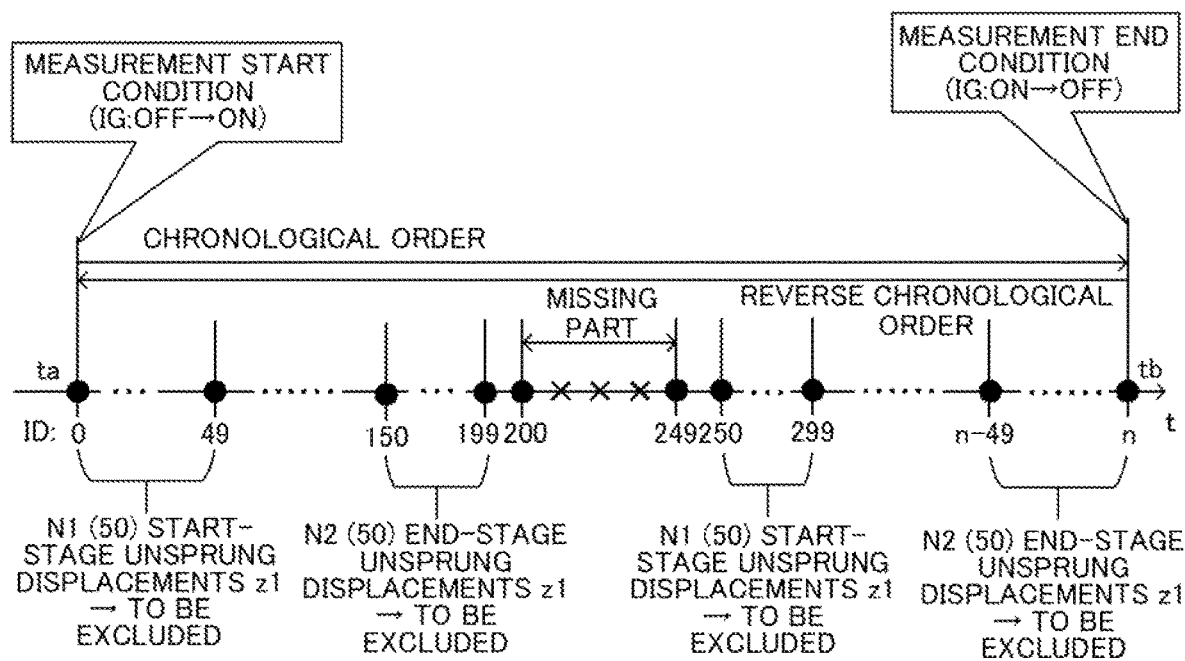
FIG. 11 is an explanatory diagram of start-stage unsprung displacements and end-stage unsprung displacements in a first modification example of the present disclosure.

With reference to FIG. 11, description is now given of the first modification example.

In FIG. 11, the travel information received by the management server 22 includes a missing part caused by the failure of the transmission of the part of the travel information by the vehicle 30.

In Step 730 of FIG. 7, the first CPU adds an ID to a data set when the travel information is stored. When the vehicle 30 fails the transmission of a part of the travel information, there occurs a missing part (discontinuous part) in IDs of data sets of the travel information received by the management server 22. Thus, the second CPU determines whether or not the received travel information has a missing part of the IDs after the execution of the processing step of Step 920 of FIG. 9.

In the example of FIG. 11, an ID "200" to an ID "249" are missing. Thus, the second CPU determines that there exists a missing part in the IDs of the travel information (that is, it is determined that the travel information includes a missing part). In this case, the second CPU identifies, as an end-point unsprung displacement z1, an unsprung displacement z1 identified based on the data set having an ID "199" immediately before the start of the missing part, and identifies, as end-stage unsprung displacements z1, unsprung displacements z1 having an ID "150" to the ID "199". Further, the second CPU identifies, as a start-point unsprung displacement z1, an unsprung displacement z1 identified based on the data set having an ID "250" immediately after the end of the missing part, and identifies, as start-stage unsprung displacements z1, unsprung displacements z1 having the ID "250" to an ID "299".

Thus, in the example of FIG. 11, the unsprung displacement information is not updated based on the unsprung displacements z1 having the ID "0" to an ID "49", the ID "150" to the ID "299", and the ID "n−49" to the ID "n". In this manner, the unsprung displacement information is not updated based on the unsprung displacement z1 having low precision, and it is thus possible to prevent the decrease in precision of the unsprung displacement z1 included in the data set of the unsprung displacement information.

In contrast to the example of FIG. 11, due to the failure of the acquisition of the detection signal from the acceleration sensor 42 by the vehicle 30, the travel information received by the management server 22 may include a missing part. In this case, there does not occur a part missing in IDs of the data sets of the travel information received by the manage-ment server 22. Thus, the second CPU calculates the travel distance D of the vehicle 30 in the measurement interval between the data sets, and determines, when the travel distance D is equal to or longer than a predetermined threshold distance Dth, that a part corresponding to this distance is a missing part. In this determination method, it is also possible to determine that the travel information includes a missing part due to failure of the transmission of a part of the travel information by the vehicle 30.

Further, in Step 730 of FIG. 7, the first CPU may store a data set of the travel information to which an acquisition time of this data set is added. In this case, when a difference in acquisition time between successive data sets of the travel information received by the management server 22 is equal to or longer than a threshold value, the second CPU may determine this part as a missing part.

Second Modification Example

The second CPU may apply the high-pass filter processing to the unsprung displacement z1 in a chronological order of the acquisition of the sprung acceleration ddz2 and the stroke H which are used for the calculation of the unsprung displacement z1, to thereby remove the low frequency component from the unsprung displacement z1. In this case, it is only required that the second CPU identify only the start-stage unsprung displacements z1, and not update the unsprung displacement information based on the start-stage unsprung displacements z1.

Further, the second CPU may apply the high-pass filter processing to the unsprung displacement z1 in a reverse chronological order of the above-mentioned acquisition, to thereby remove the low frequency component from the unsprung displacement z1. In this case, it is only required that the second CPU identify only the end-stage unsprung displacements z1, and not update the unsprung displacement information based on the end-stage unsprung displacements z1.

Third Modification Example

In a third modification example of the present disclosure, in Step 910 of FIG. 9, the second CPU executes second-order integration through application of the fast Fourier transform (hereinafter referred to as "FFT") to the sprung acceleration ddz2, to thereby obtain the sprung displacement z2.

Figure 12:
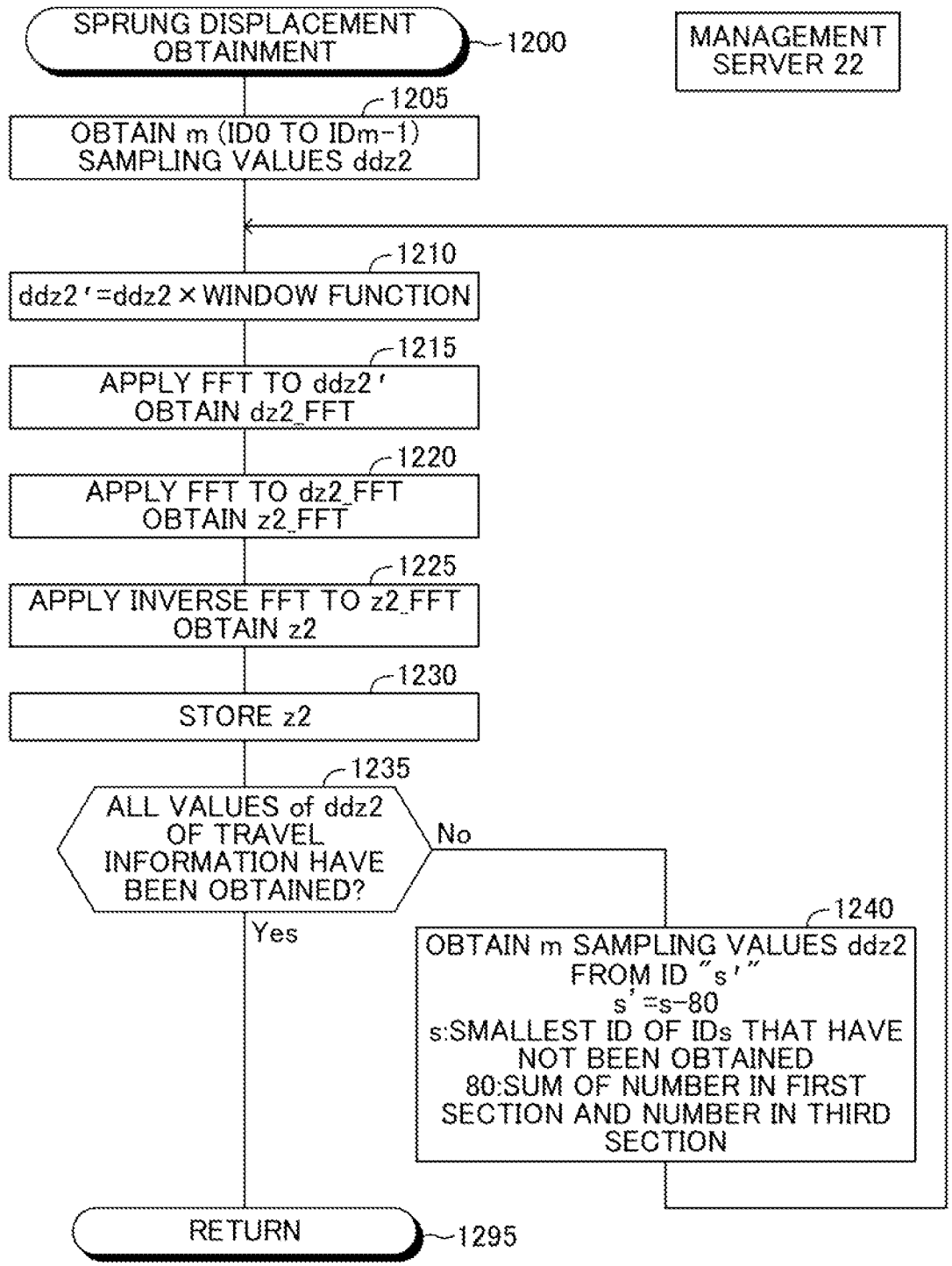
FIG. 12 is a flowchart for illustrating a sprung displacement obtainment routine executed by a server in a second modification example of the present disclosure.
Figure 13:
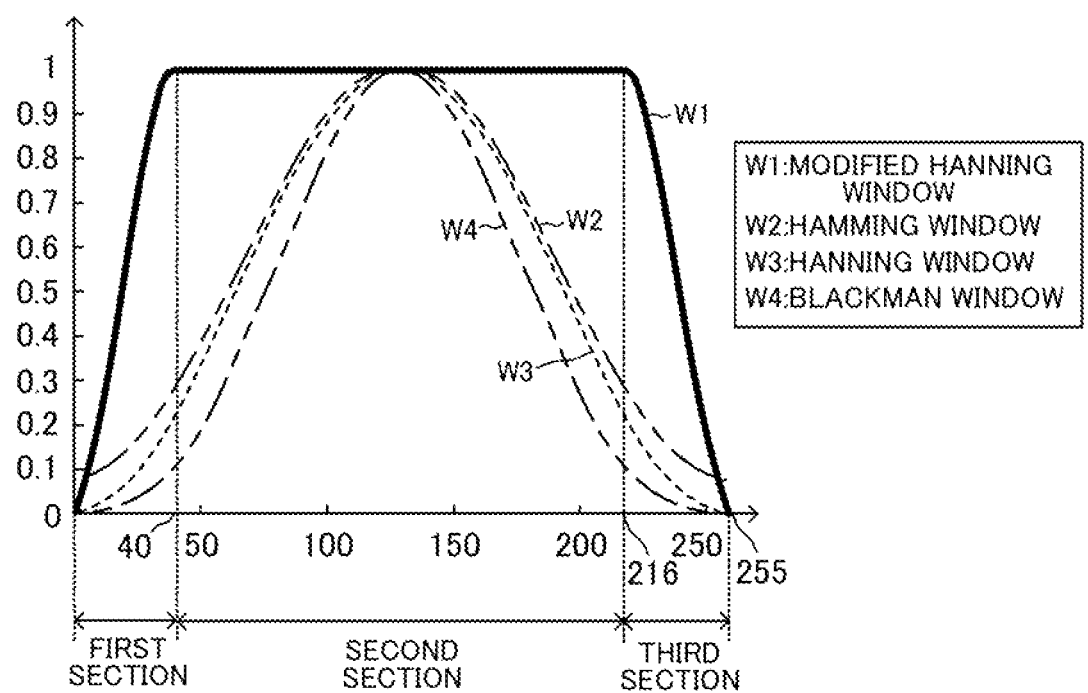
FIG. 13 is a graph of window functions to be used in fast Fourier transform.

With reference to FIG. 12 and FIG. 13, description is now given of the FFT used in the third modification example.

<Unsprung Displacement Obtainment Routine>

When the process proceeds to Step 910 of FIG. 9, the second CPU starts processing from Step 1200 of a subroutine (unsprung displacement obtainment routine) illustrated as a flowchart of FIG. 12, and executes processing steps of Step 1205 to Step 1235.

Step 1205: The second CPU obtains, as sampling values ddz2, a predetermined number ("m") of the sprung accelerations ddz2 from a sprung acceleration ddz2 at a start point of the received travel information, and assigns sampling IDs to the "m" sprung accelerations ddz2 in an ascending order of the ID. Description is now given while it is assumed that "m" is 256.

In more detail, the second CPU obtains the "m" sprung accelerations ddz2 having the ID "0" to an ID "m−1" of the travel information as the sampling values ddz2. After that, the second CPU assigns a sampling ID "0" to a sampling ID "m−1" to those sampling values ddz2.

Step 1210: The second CPU multiplies each sampling value ddz2 and "a weight coefficient corresponding to the sampling value ddz2 defined in a window function W1" by each other, to thereby obtain a sampling value ddz2' for processing.

With reference to FIG. 13, description is now given of the window function W1.

The window function W1 defines weight coefficients for the sampling values ddz2 from the sampling ID "0" to the sampling ID "255". A vertical axis of a graph of FIG. 13 represents the weight coefficient, and a horizontal axis thereof represents the sampling ID. The weight coefficient is a value equal to or larger than "0" and equal to or smaller than "1".

The window function W1 includes a first section being a section of the sampling IDs in which the weight coefficient is set to a value smaller than "1" and increases from "0" to "1", a second section being a section of the sampling IDs in which the weight coefficient is maintained to be "1", and a third section being a section of the sampling IDs in which the weight coefficient is set to a value smaller than "1" and decreases from "1" to "0". As shown in FIG. 13, 40 sampling values ddz2 having the sampling ID "0" to a sampling ID "39" belong to the first section. Those sampling values ddz2 are sometimes referred to as "start-stage sampling values." 176 sampling values ddz2 having a sampling ID "40" to a sampling ID "215" belong to the second section. Those sampling values ddz2 are sometimes referred to as "intermediate-stage sampling values." 40 sampling values ddz2 having a sampling ID "216" to a sampling ID "255" belong to the third section. Those sampling values ddz2 are sometimes referred to as "end-stage sampling values."

The weight coefficient in the first section is only required to be a value that is smaller than "1" and gradually increases to "1", and the first value of the weight coefficient in the first section is not required to be "0". The weight coefficient in the third section is only required to be a value that is smaller than "1" and gradually decreases from "1", and the last value of the weight coefficient in the third section is not required to be "0". Further, the number of the sampling values ddz2 belonging to the first section and the number of the sampling values ddz2 belonging to the third section may be values different from each other.

In FIG. 13, window functions W2 to W4 that are generally used are also shown for a comparison to the window function W1 used in the at least one embodiment. The window function W2 is a Hamming window function, the window function W3 is a Hanning window function, and the window function W4 is a Blackman window function. As shown in FIG. 13, the second section of the window functions W2 to W4 includes only one sampling ID (that is, the second section includes only one sampling value). Meanwhile, the second section of the window function W1 includes a plurality of sampling IDs (that is, the second section includes at least two sampling values). For the window function W1, the original values of sampling values the number of which is more than those for the window functions W2 to W4 are used for the FFT. As a result, it is possible to obtain a larger number of accurate sprung displacements z2.

Step 1215: The second CPU applies the FFT to the sampling value ddz2' for processing, to thereby obtain a value dz2_FFT being a time integral of the sampling value ddz2' for processing.

Step 1220: The second CPU applies the FFT to the value dz2_FFT, to thereby obtain a value z2_FFT being a time integral of the value dz2_FFT.

Step 1225: The second CPU applies the inverse FFT to the value z2_FFT, to thereby obtain a sprung displacement z2.

Step 1230: The second CPU stores the sprung displacement z2 and the ID of the data set of the travel information corresponding to the sprung displacement z2 in the RAM in association with each other.

Step 1235: The second CPU determines whether or not all of the sprung accelerations ddz2 of the travel information have been obtained as the sampling values ddz2.

When all of the sprung accelerations ddz2 of the travel information have not been obtained as the sampling values ddz2, the second CPU makes a determination of "No" in Step 1235, and the process proceeds to Step 1240.

In Step 1240, the second CPU obtains, as the sampling values, "m" sprung accelerations ddz2 from data sets (having an ID "s'" to an ID "s'+m−1") of the travel information.

The second CPU obtains "s'" by subtracting a sum (80) of the number of the sampling values ddz2 belonging to the first section and the third section from the minimum ID (ID "s") of IDs of data sets of the sprung accelerations ddz2 that have not been obtained as the sampling values ddz2, to thereby obtain "s'" (s'=s−80). As a result, the last sampling value ddz2 multiplied by the weight coefficient of the second section of the window function W1 of the sampling values ddz2 obtained the previous time and the first sampling value ddz2 multiplied by the weight coefficient of the second section of the window function W1 of the sampling values ddz2 obtained this time are continuous to each other. Thus, there are obtained a larger number of the sprung displacements z2 calculated based on the original values of the sprung accelerations ddz2.

After the second CPU obtains the new sampling values ddz2 in Step 1240, the second CPU executes processing steps of Step 1210 to Step 1225, to thereby obtain the sprung displacement z2. After that, the process proceeds to Step 1230. Then, the second CPU stores the sprung displacement z2 in the RAM, and the process proceeds to Step 1235. In this case, the IDs of the sprung displacements z2 obtained based on the sampling values ddz2 multiplied by the weight coefficient of the third section for the previous time and the IDs of the sprung displacements z2 obtained based on the sampling values ddz2 multiplied by the weight coefficient of the second section for this time overlap with each other. The second CPU overwrites the sprung displacements z2 obtained the previous time by the sprung displacements z2 obtained this time.

The sprung displacements z2 other than the following sprung displacements z2 are obtained based on the original values of the sprung accelerations ddz2. As a result, it is possible to obtain a larger number of accurate sprung displacements z2.

- Sprung displacements z2 (first-section sprung displacements z2) obtained based on the sampling values ddz2 which are multiplied by the weight coefficients of the first section among the sampling values ddz2 obtained (in Step 1205) from the start part of the travel information.
- Sprung displacements z2 (third-section sprung displacements z2) obtained based on the sampling values ddz2 which are multiplied by the weight coefficients of the third section among the sampling values ddz2 obtained in Step 1240 from the last part of the travel information.

When all of the sprung accelerations ddz2 of the travel information have been obtained as the sampling values ddz2 in the case in which the process proceeds to Step 1235, the second CPU makes a determination of "Yes" in Step 1235, and the process proceeds to Step 1295. Then, the second CPU temporarily finishes this routine, and the process proceeds to Step 915 of FIG. 9.

The number of the sampling values ddz2 corresponding to the first section (hereinafter sometimes referred to as "third predetermined number") is set to a value equal to or smaller than the number (N1) of the unsprung displacements z1 identified as the start-stage unsprung displacements z1. As a result, it is possible to reliably prevent the update of the unsprung displacement information based on the unsprung displacement z1 obtained based on the sprung displacement z2 in the first section. Similarly, the number of the sampling values ddz2 corresponding to the third section (hereinafter sometimes referred to as "fourth predetermined number") is set to a value equal to or smaller than the number (N2) of the unsprung displacements z1 identified as the end-stage unsprung displacements z1.

When the travel information includes a missing part, the second CPU determines whether or not there have been obtained, as the sampling values ddz2, the sprung accelerations ddz2 to the sprung acceleration ddz2 immediately before the start of the missing part in Step 1235. When there have not been obtained, as the sampling values ddz2, the sprung accelerations ddz2 to the sprung acceleration ddz2 immediately before the start of the missing part, the process proceeds to Step 1240, and the second CPU obtains a next sampling value ddz2. Meanwhile, when there have been obtained, as the sampling values ddz2, the sprung accelerations ddz2 to the sprung acceleration ddz2 immediately before the start of the missing part, the second CPU obtains, as the sampling values ddz2, "m" the sprung accelerations ddz2 immediately after the missing part, and executes processing steps of Step 1210 to Step 1230. Then, the process proceeds to Step 1235. In Step 1235, the second CPU determines whether or not the sprung accelerations ddz2 other than those in the missing part have been obtained as the sampling values ddz2.

Fourth Modification Example

In a fourth modification example of the present disclosure, the second CPU may set the number N1 of the start-stage unsprung displacement z1 and the number N2 of the end-stage unsprung displacements z1 based on the vehicle speed V1 of the vehicle 30 and the cutoff frequency used in Step 920 of FIG. 9. In more detail, the second CPU calculates the wavelength of vibration input to the unsprung portion 50 when it is assumed that the vehicle 30 travels at the vehicle speed V1 on a road surface having a road surface displacement at the cutoff frequency, and sets, to N1 and N2, the number of the unsprung displacements z1 required to identify ¼ or more of this wavelength.

The second CPU may use an average vehicle speed V1 in an acquisition period of the travel information as the vehicle speed V1, to thereby set N1 and N2. Further, the second CPU may use, as the vehicle speed V1, an average vehicle speed V1 until a predetermined number of the sprung accelerations ddz2 are obtained after the start point of the travel information, to thereby set N1. Further, the second CPU may use, as the vehicle speed V1, an average vehicle speed V1 until a predetermined number of the sprung accelerations ddz2 to the end point of the travel information are obtained, to thereby set N2.

When the second CPU sets N1 and N2 based on the vehicle speed V1 and the cutoff frequency, the second CPU sets the number of the sampling values ddz2 in the first section of the window function W1 so that the number is equal to or smaller than N1, and sets the number of the sampling values ddz2 in the third section of the window function W1 so that the number is equal to or smaller than N2.

Fifth Modification Example

In the at least one embodiment, when a predetermine period has elapsed since the transmission of the travel information for the previous time, the first CPU may determine that the transmission condition is satisfied, and may transmit the travel information. In this case, the second CPU manages the received travel information for each vehicle 30. The second CPU updates the unsprung displacement information each time the travel information is received.

More specifically, when there exists the travel information received the previous time from the same vehicle 30, the second CPU couples "the unsprung displacements z1 (previous-time unsprung displacements z1) obtained based on the travel information received the previous time" and "the unsprung displacements z1 (this-time unsprung displacements z1) obtained based on the travel information received this time" to each other, and applies the high-pass filter processing to the coupled unsprung displacements z1. As a result of this high-pass filter processing, accurate values are obtained in the portion at the start stage of the unsprung displacements z1 for the current time, and accurate values are obtained also in the portion at the end stage of the unsprung displacements z1 for the previous time.

Thus, the second CPU updates matching data sets corresponding to a portion other than the end-stage unsprung displacements z1 of the unsprung displacements z1 for the current time based on an result of application of the high-pass filter processing, and updates matching data sets corresponding to the end-stage unsprung displacements z1 of the unsprung displacements z1 for the previous time based on the result of application of the high-pass filter processing. As a result, the update of the unsprung displacement information based on the start-stage unsprung displacements z1 immediately after the measurement start condition is satisfied is not executed, and the update of the unsprung displacement information based on the end-stage unsprung displacements z1 immediately before the measurement end condition is satisfied is not executed.

Sixth Modification Example

An average vehicle speed V1ave of each block Gd is further stored in the unsprung displacement information. When the process proceeds to Step 940 of FIG. 9, the second CPU obtains, from the unsprung displacement information, the average vehicle speed V1ave in the block Gd identified based on the position indicated by the position information (x, y) of the processing data set. After that, the second CPU sets the speed threshold value V1th based on the obtained average vehicle speed V1ave. For example, the second CPU sets the speed threshold value V1th to ⅓ of the average vehicle speed V1ave.

Seventh Modification Example

The second CPU applies the high-pass filter processing to the unsprung displacement z1 in the routine of FIG. 9, but the second CPU may apply the high-pass filter processing to the sprung acceleration ddz2 or the sprung displacement z2.

Eighth Modification Example

A part of the vehicles 30 may be vehicles that are dedicated for measurement (general vehicles), which collect the travel information but do not execute the preview damping control. The vehicle dedicated for measurement is different from a preview vehicle capable of executing the preview damping control in a point that the vehicle does not include the active actuators 37 of FIG. 3. Further, the vehicle dedicated for measurement executes the routines of FIG. 6 to FIG. 8, but does not execute the routine of FIG. 10. The vehicle dedicated for measurement is sometimes referred to as "first vehicle." The preview vehicle is sometimes referred to as "second vehicle."

Ninth Modification Example

It is not always required to store the unsprung displacement information in the storage media 24, and it is only required to store the unsprung displacement information in the storage device 41a of the vehicle 30. In this case, the function of the management server 22 is implemented in the vehicle 30. That is, when the process proceeds to Step 815 of FIG. 8, the first CPU of the vehicle 30 is configured to execute, in place of Step 815, Step 910 to Step 955 of FIG. 9.

Further, the unsprung displacement information may be stored in the storage device 41a of the vehicle dedicated for measurement in the above-mentioned eighth modification example. In this case, the function of the management server 22 is implemented in the vehicle dedicated for measurement. The preview vehicle obtains the unsprung displacement information from the vehicle dedicated for measurement, and executes the preview damping control.

Tenth Modification Example

When the traveling course (traveling route) on which the vehicle 30 passes is determined in advance, the first CPU may download, in advance, the position information and the unsprung displacements $z1$ on the traveling path from the unsprung displacement information stored in the storage media 24, and may store the position information and the unsprung displacements $z1$ in the storage device 41a before the vehicle 30 starts the travel on the traveling course.

Eleventh Modification Example

In place of the unsprung displacements $z1$, the road surface displacements $z0$ may be stored in the unsprung displacement information. In this case, the first CPU uses the road surface displacement $z0$ in place of the unsprung displacement $z1$ for the calculation of the target control force Fct.

The road surface displacement $z0$ can be measured by laser imaging detection and ranging (Lidar) (not shown). The vehicle 30 stores the road surface displacement $z0$ measured by the Lidar as the sensor value of the travel information, and transmits the travel information to the management server 22. The Lidar is a well-known periphery sensor for emitting a light ray and receiving a reflected light ray of the emitted light ray, to thereby detect positions of 3D objects existing around the vehicle 30 with respect to the vehicle 30. The road surface displacement $z0$ can also be measured by a camera sensor, a radar, or the like other than the Lidar.

In place of the unsprung displacement $z1$, the unsprung speed $dz1$ may be stored in the unsprung displacement information. In this case, the second CPU differentiates the unsprung displacement $z1$ obtained in Step 915 of FIG. 9 with respect to time, to thereby obtain the unsprung speed $dz1$. Further, the first CPU integrates the unsprung speed $dz1$ obtained in Step 1020 of FIG. 10, to thereby obtain the unsprung displacement $z1$. Similarly, in place of the unsprung displacement $z1$, "a road surface displacement speed $dz0$ being a time derivative of the road surface displacement $z0$" may be stored in the unsprung displacement information.

Further, the unsprung displacement $z1$ and the unsprung speed $dz1$ may be stored in the unsprung displacement information. In this case, the second CPU calculates the target control force Fct through use of Expression (3). The road surface displacement $z0$ and the road surface displacement speed $dz0$ may be stored in the unsprung displacement information.

The unsprung displacement $z1$, the unsprung speed $dz1$, the road surface displacement $z0$, and the road surface displacement speed $dz0$ are sometimes collectively referred to as "road surface displacement-related values."

In the at least one embodiment and the modification examples described above, the vehicle 30 transmits, to the management server 22, the sprung acceleration ddz2 and the stroke H as the measurement values of the travel information, but the vehicle 30 may transmit, to the management server 22, the unsprung displacement $z1$ which the second CPU obtains to execute Step 910 and Step 915 for the sprung acceleration ddz2 as the measurement value of the travel information.

Twelfth Modification Example

The vehicle speed V1 and the traveling direction Td are obtained based on the current position of the vehicle 30 obtained by the GNSS receiver 44, but the configuration is not limited to this example. For example, the vehicle 30 may obtain the vehicle speed V1 based on the rotation speed of the wheel 31 measured by a wheel speed sensor (not shown). The vehicle 30 may obtain the traveling direction Td based on a yaw rate acting on the vehicle 30, which is measured by a yaw rate sensor (not shown), and the vehicle speed V1.

Thirteenth Modification Example

The suspension 33 may be any type of suspension as long as the wheel 31 can vertically be displaced with respect to the vehicle body 30a (the vehicle body 30a can be vertically displaced with respect to the wheel 31). Further, the suspension spring 36 may be any spring such as a compression coil spring and an air spring.

The active actuator 37 is provided to each of the four wheels 31 in the at least one embodiment, but it is only required to provide the active actuator 37 to at least one wheel 31.

The control force generation device is only required to be an actuator capable of generating the vertical control force Fc for damping the sprung portion 51 based on "the control command including the target control force Fct."

The control force generation device may be an active stabilizer device (not shown). For example, the active stabilizer device provided to the right front wheel 31FR generates a control force in a direction opposite to that of a control force generated by the active stabilizer provided to the left front wheel 31FL. The configuration of the active stabilizer is well known as described in Japanese Patent Application Laid-open No. 2009-96366, and is hereby incorporated by reference into this application.

The control force generation device may be a device for generating the vertical control force Fc through use of the geometry of the suspension 33 by increasing and reducing a braking force and a driving force acting on each wheel 31. The configuration of this device is well known as described in Japanese Patent Application Laid-open No. 2016-107778, and is hereby incorporated by reference into this application. In this case, the first CPU calculates the braking force and the driving force for generating the target control force Fct.

Further, the control force generation device may be the shock absorber 35 of the variable damping force type. In this case, the first CPU controls the damping coefficient C of the shock absorber 35 so that the damping force of the shock absorber 35 changes in accordance with a value corresponding to the target control force Fct.

What is claimed is:

1. An update system for related value information, comprising:
a first vehicle and a second vehicle, wherein the second vehicle is the same vehicle as the first vehicle or a vehicle different from the first vehicle; and
a storage device,
wherein the storage device is arranged in any one of the first vehicle, the second vehicle, and a place other than the first vehicle and the second vehicle,
wherein the first vehicle includes a sensor configured to measure a sensor value for identifying a road surface displacement-related value, which is a value related to a road surface displacement being a displacement, in a vertical direction, of a road surface on which the first vehicle travels,
wherein the second vehicle includes a control force generation device configured to generate a control force in the vertical direction such that the control force is generated between at least one wheel of the second vehicle and a vehicle body part corresponding to a position of the at least one wheel,
wherein the first vehicle is configured to:
obtain the sensor value from the sensor at predetermined measurement intervals and obtain a measurement position at which the sensor value is measured, in a period from a time at which a predetermined measurement start condition is satisfied to a time at which a predetermined measurement end condition is satisfied; and
provide, to the storage device, travel information formed by associating the sensor value and the measurement position with each other,
wherein the second vehicle is configured to:
obtain, through use of the related value information held by the storage device, as a control related value, a road surface displacement-related value at a predicted passing position at which the at least one wheel is predicted to pass at a time when a predetermined period elapses from a current time;
obtain a target force for damping a sprung portion of the second vehicle based on the control related value; and
execute preview damping control of controlling the control force generation device such that the control force generation device coincides the control force with the target force when the wheel passes the predicted passing position,
wherein the storage device includes a related value information storage configured to store related value information in which the road surface displacement-related value corresponding to a position of the road surface is registered, and
wherein the storage device is configured to:
apply high-pass filter processing to one of the sensor value included in the travel information provided from the first vehicle and the road surface displacement-related value identified based on the sensor value, to thereby obtain a road surface displacement-related value from which a low frequency component lower than a predetermined cutoff frequency is removed;
add a value which is obtained by applying the high-pass filter processing to one of the sensor value and the road surface displacement-related value in a chronological order of the measurement of the sensor value, and a value which is obtained by applying the high-pass filter processing to one of the sensor value and the road surface displacement-related value in a reverse chronological order of the measurement of the sensor value, to each other, to thereby remove the low frequency component from the road surface displacement-related value;
update the related value information based on the road surface displacement-related values obtained by excluding, from the road surface displacement-related values from which the low frequency component is removed, at least one of: start-stage related values being a first predetermined number of road surface displacement-related values from a start-point related value being a road surface displacement-related value identified based on the sensor value obtained when the predetermined measurement start condition is satisfied; or end-stage related values being a second predetermined number of road surface displacement-related values to an end-point related value being a road surface displacement-related value identified based on the sensor value obtained when the predetermined measurement end condition is satisfied; and
update the related value information based on the road surface displacement-related values obtained by excluding the start-stage related values and the end-stage related values from the road surface displacement-related values from which the low frequency component is removed.

2. The update system for related value information according to claim 1, wherein the storage device is configured to:
determine whether the sensor values of the travel information provided from the first vehicle include a missing part having missing sensor values;
identify, when the sensor values of the travel information are determined to include the missing part, as the end-point related value, the road surface displacement-related value identified based on the sensor value obtained immediately before a start of the missing part; and
identify, when the sensor values of the travel information are determined to include the missing part, as the start-point related value, the road surface displacement-related value identified based on the sensor value obtained immediately after an end of the missing part.

3. The update system for related value information according to claim 1, wherein the storage device is configured to determine the first predetermined number and the second predetermined number based on a magnitude of a travel speed of the first vehicle and the predetermined cutoff frequency.

4. The update system for related value information according to claim 3, wherein the road surface displacement-related value is an unsprung displacement representing a displacement of an unsprung portion of the first vehicle,
wherein the storage device is configured to
calculate a wavelength of vibration input to the unsprung portion when it is assumed that the first vehicle travels at a predetermined vehicle speed on a road surface displacement at the cutoff frequency; and
set the number of the unsprung displacements required to identify ¼ or more of the wavelength to the first predetermined number and the second predetermined number.

5. The update system for related value information according to claim 4, wherein the storage device is configured to use an average vehicle speed in an acquisition period of the travel information as the predetermined vehicle speed, to set the first predetermined number and the second predetermined number.

6. The update system for related value information according to claim 4, wherein the storage device is configured to use an average vehicle speed until a predetermined number of the sensor values are obtained after a time point at which the predetermined measurement start condition is satisfied as the predetermined vehicle speed, to set the first predetermined number.

7. The update system for related value information according to claim 4, wherein the storage device is configured to use an average vehicle speed until a predetermined number of the sensor values to a time point at which the predetermined measurement end condition is satisfied are obtained as the predetermined vehicle speed, to set the second predetermined number.

8. The update system for related value information according to claim 1,
wherein the storage device is configured to:
obtain, as sampling values, a predetermined number of the sensor values included in the travel information in a chronological order of the measurement of the sensor values;
apply fast Fourier transform to a value obtained by multiplying a weight coefficient, which is defined by a predetermined window function and corresponds to each of the sampling values, by the each of the sampling values, to thereby identify the road surface displacement-related value corresponding to the each of the sampling values; and
obtain a next sampling value from the sensor values included in the travel information after the application of the fast Fourier transform, and apply the fast Fourier transform to the value obtained by multiplying the next sampling value by the weight coefficient,
wherein, in the predetermined window function:
weight coefficients that reduce the sampling value to a smaller value are associated with start-stage sampling values, which are a third predetermined number of sampling values from a start point of the sampling values, and end-stage sampling values, which are a fourth predetermined number of sampling values to an end of the sampling values; and
a weight coefficient that maintains an original value of the sampling value is associated with intermediate-stage sampling values being sampling values other than the start-stage sampling values and the end-stage sampling values, and wherein the storage device is configured to update the related value information based on the road surface displacement-related values obtained by excluding both of the start-stage related values and the end-stage related values from the road surface displacement-related values from which the low frequency component is removed.

9. The update system for related value information according to claim 8, wherein the storage device is configured to apply the fast Fourier transform while obtaining the sampling value so that an end point of the intermediate-stage sampling values obtained a previous time is continuous to a start point of the intermediate-stage sampling values obtained this time, to thereby identify the road surface displacement-related value corresponding to the sensor value.

10. The update system for related value information according to claim 8,
wherein the third predetermined number is set to a value equal to or smaller than the first predetermined number, and
wherein the fourth predetermined number is set to a value equal to or smaller than the second predetermined number.

11. The update system for related value information according to claim 1, wherein the storage device is configured to update the related value information based on the road surface displacement-related values obtained by further excluding the road surface displacement-related values identified based on the sensor values measured when a magnitude of a travel speed of the first vehicle is equal to or smaller than a threshold value.

12. An update method for related value information in which a road surface displacement-related value measured by a first vehicle, which is a value related to a road surface displacement, in a vertical direction, of a road surface corresponding to a position of the road surface, is registered, the update method comprising:
obtaining, at predetermined measurement intervals, a sensor value measured by a sensor of the first vehicle to identify the road surface displacement-related value of a road surface on which the first vehicle is traveling and obtaining a measurement position at which the sensor value is measured, in a period from a time at which a predetermined measurement start condition is satisfied to a time at which a predetermined measurement end condition is satisfied;
generating a control force in the vertical direction by a second vehicle such that the control force is generated between at least one wheel of the second vehicle and a vehicle body part corresponding to a position of the at least one wheel;
obtaining a road surface displacement related value at a predicted passing position of the second vehicle at which the at least one wheel is predicted to pass at a time when a predetermined period elapses from a current time;
obtaining a target force for damping a sprung portion of the second vehicle based on the road surface displacement related value by the second vehicle;
executing preview damping control of controlling a control force generation device by the second vehicle such that the control force generation device coincides the control force with the target force when the wheel passes the predicted passing position;
applying high-pass filter processing to one of the sensor value and the road surface displacement-related value identified based on the sensor value, to thereby obtain a road surface displacement-related value from which a low frequency component lower than a predetermined cutoff frequency is removed;

adding a value which is obtained by applying the high-pass filter processing to one of the sensor value and the road surface displacement-related value in a chronological order of the measurement of the sensor value, and a value which is obtained by applying the high-pass filter processing to one of the sensor value and the road surface displacement-related value in a reverse chronological order of the measurement of the sensor value, to each other, to thereby remove the low frequency component from the road surface displacement-related value; and updating the related value information based on the road surface displacement-related values obtained by excluding, from the road surface displacement-related values from which the low frequency component is removed, at least one of: start-stage related values being a first predetermined number of road surface displacement-related values from a start-point related value being a road surface displacement-related value identified based on the sensor value obtained when the predetermined measurement start condition is satisfied; or end-stage related values being a second predetermined number of road surface displacement-related values to an end-point related value being a road surface displacement-related value identified based on the sensor value obtained when the predetermined measurement end condition is satisfied; and updating the related value information based on the road surface displacement-related values obtained by excluding the start-stage related values and the end-stage related values from the road surface displacement-related values from which the low frequency component is removed.

* * * * *